United States Patent [19]

Freeny, Jr.

[11] Patent Number: 4,528,643
[45] Date of Patent: Jul. 9, 1985

[54] SYSTEM FOR REPRODUCING INFORMATION IN MATERIAL OBJECTS AT A POINT OF SALE LOCATION

[75] Inventor: Charles C. Freeny, Jr., Fort Worth, Tex.

[73] Assignee: FPDC, Inc., Oklahoma City, Okla.

[21] Appl. No.: 456,730

[22] Filed: Jan. 10, 1983

[51] Int. Cl.³ .............................................. G06F 1/00
[52] U.S. Cl. .................................................. 364/900
[58] Field of Search ... 364/200 MS File, 900 MS File

[56] References Cited

U.S. PATENT DOCUMENTS

| | | |
|---|---|---|
| 3,829,833 | 8/1974 | Freeny, Jr. . |
| 3,911,397 | 10/1975 | Freeny, Jr. . |
| 3,924,065 | 12/1975 | Freeny, Jr. . |
| 3,946,220 | 3/1976 | Brobeck et al. . |
| 3,970,992 | 7/1976 | Boothroyd et al. . |
| 4,071,911 | 1/1978 | Mazur .............................. 364/900 |
| 4,112,421 | 9/1978 | Freeny, Jr. . |
| 4,209,787 | 1/1980 | Freeny, Jr. . |
| 4,217,588 | 8/1980 | Freeny, Jr. . |
| 4,220,991 | 9/1980 | Hamano et al. . |
| 4,232,317 | 11/1980 | Freeny, Jr. . |
| 4,265,371 | 5/1981 | Desai et al. . |
| 4,270,182 | 5/1981 | Asija . |
| 4,328,544 | 5/1982 | Baldwin et al. . |

Primary Examiner—Raulfe B. Zache
Attorney, Agent, or Firm—Dunlap & Codding

[57] ABSTRACT

The present invention contemplates a system for reproducing information in material objects at a point of sale location wherein the information to be reproduced is provided at the point of sale location from a location remote with respect to the point of sale location, an owner authorization code is provided to the point of sale location in reponse to receiving a request code from the point of sale location requesting to reproducing predetermined information in a material object, and the predetermined information is reproduced in a material object at the point of sale location in response to receiving the owner authorization code.

56 Claims, 4 Drawing Figures

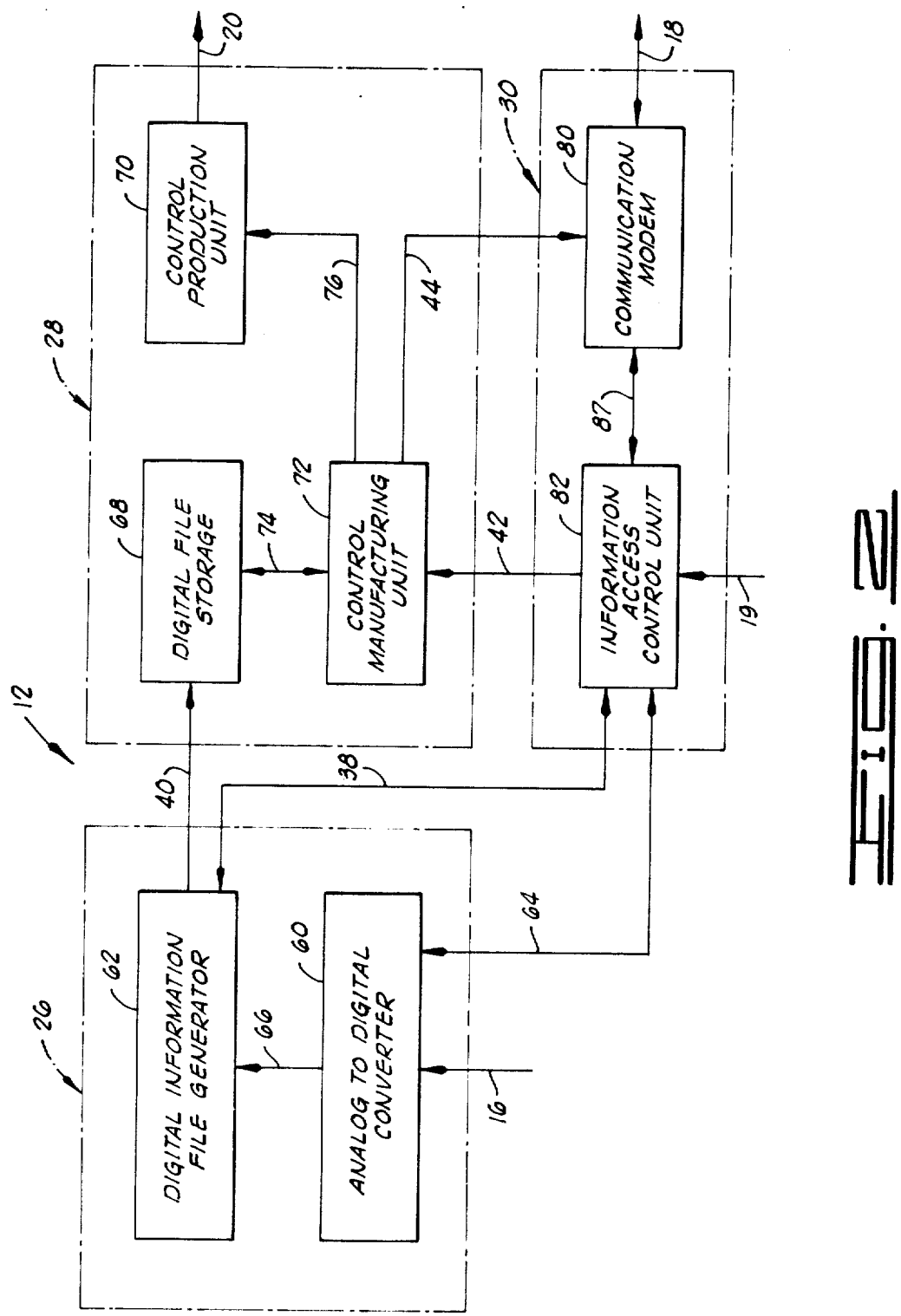

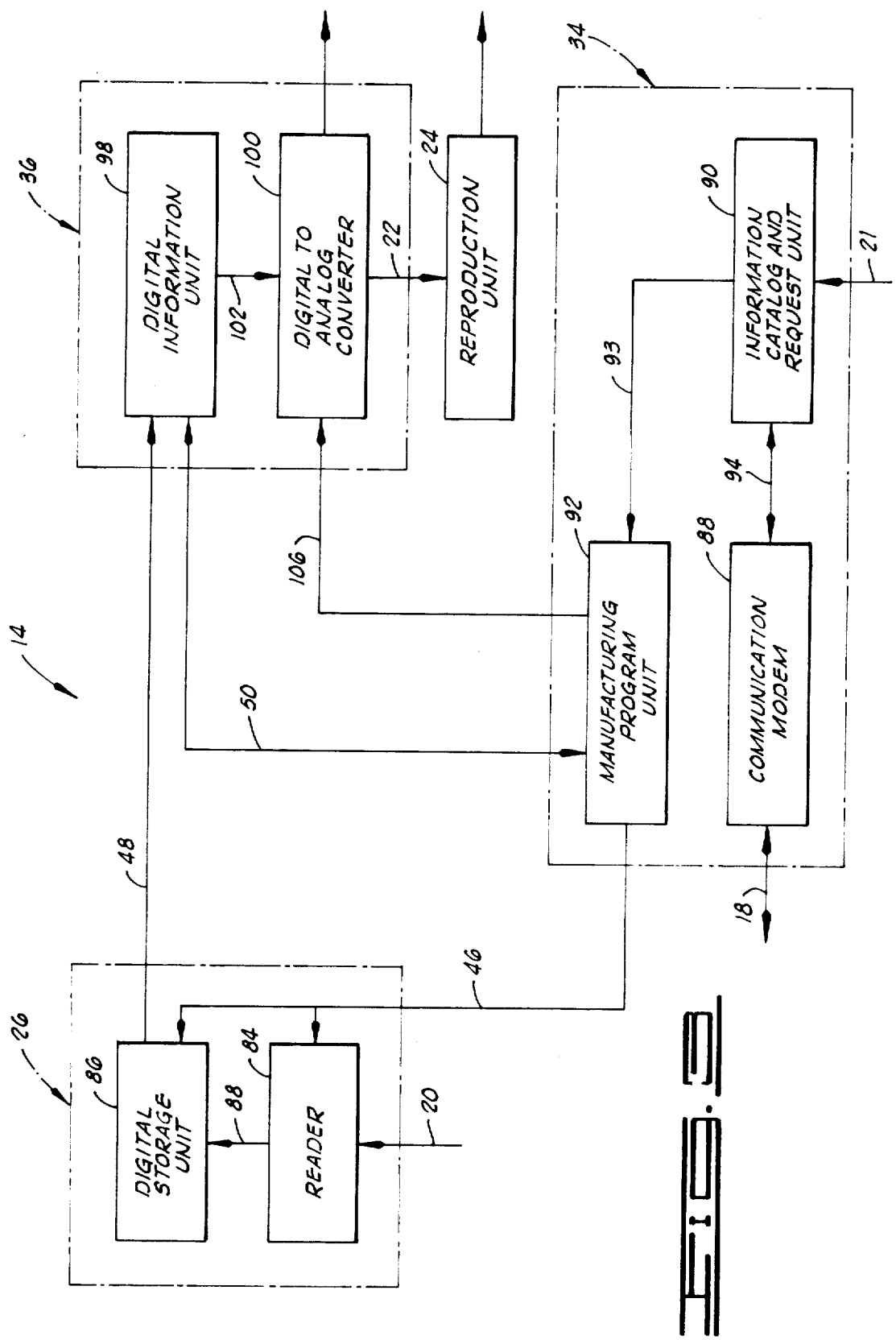

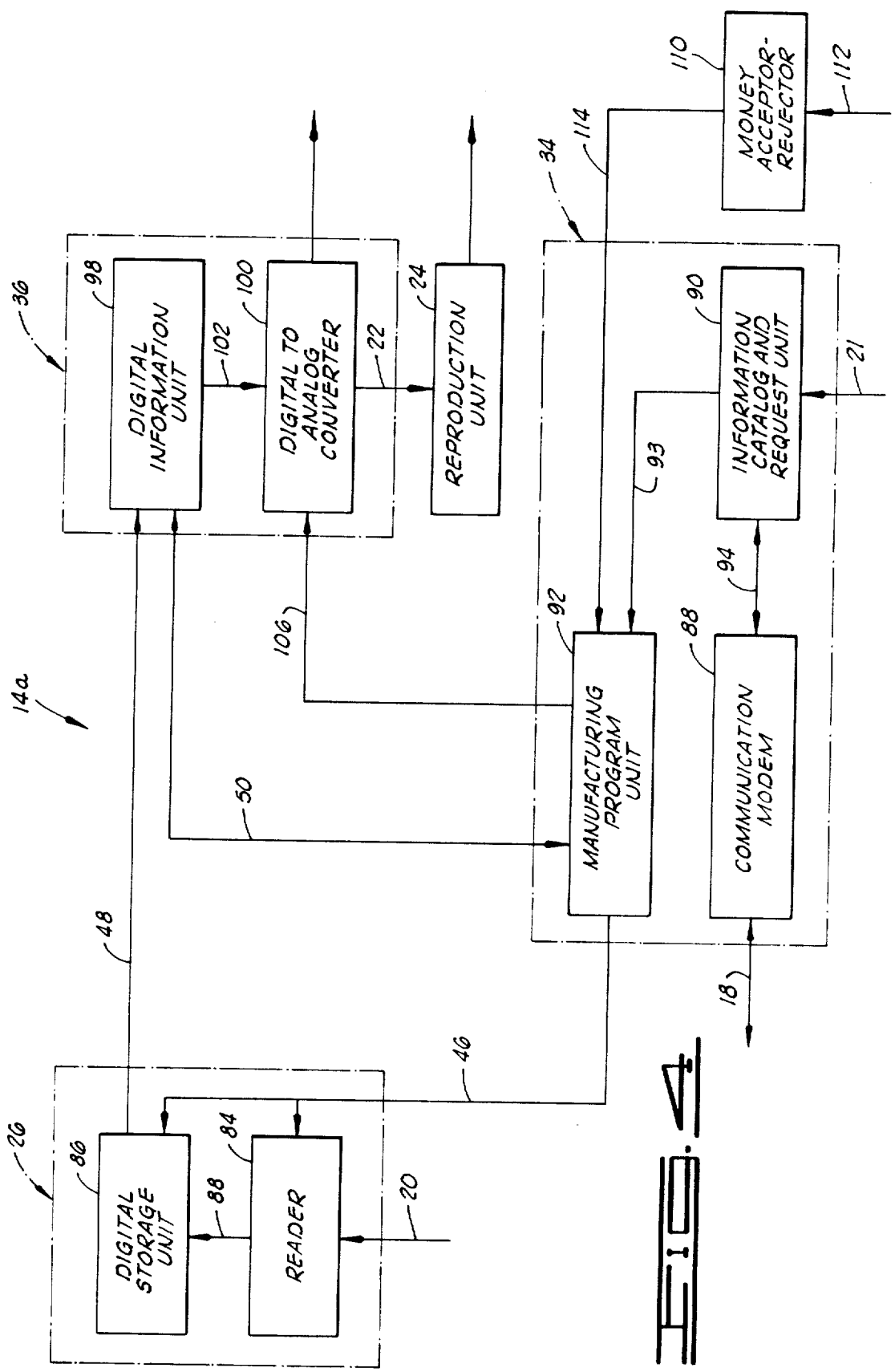

SYSTEM FOR REPRODUCING INFORMATION IN MATERIAL OBJECTS AT A POINT OF SALE LOCATION

BACKGROUND OF THE INVENTION

The present invention relates generally to a system for reproducing information in a material object at a point of sale location.

In the past, owners of information such as the information embodied in recordings (phonograph records and tapes), video games, motion pictures, software, books, handheld calculators, handheld electronic games, greeting cards, maps, sheet music and the like, for example, typically have created such information, embodied the information in material objects and distributed the material objects to various retail outlets (point of sale locations) for ultimate sale to the consumer. This system thus required manufacturing facilities for reproducing the information in material objects and a distribution network for distributing the material objects to the various point of sale locations for sale to the consumer. The manufacturing facilities and the distribution networks represent substantial costs to the owner of the information, which expenses ultimately have resulted in increased costs to the consumer.

For example, assuming the information was a recording of the artist's performances of particular musical compositions, the master recording initially was produced. Then, the master recording was utilized to embody the information contained therein in material objects or, in other words, the master recording was utilized to manufacture phonograph records, cassette tapes, 8-track tapes and various other configurations of material objects. The material objects (the phonograph records, cassette tapes, 8-track trapes and the like) then were distributed to various retail outlets (point of sale locations) for sale to the consumer.

In the recording example, the owner of the information embodied in the master recording initially had to determine how many phonograph records, cassette tapes, 8-track tapes and the like were to be manufactured. After manufacturing, the owner of the information then faced the problem of how to distribute such phonograph records and tapes to the various retail outlets and, once distributed, the owner of the information then faced the problem of collecting the monies due in connection with the sale of such phonograph records and tapes. If the phonograph records and tapes did not sell for any one of a number of reasons, the owner of the information then typically faced the problem of receiving returns of the previously distributed phonograph records and tapes. Thus, such an owner of information might distribute a large number of phonograph records and tapes, receive a relatively high percentage of such distributed phonograph records and tapes as returns, not collect a relatively high percentage of the monies due in connection with the sale of such phonograph records and tapes and, thus, the final result might be that the owner of such information merely ended up with a large inventory of phonograph records and tapes and not enough money collected even to cover the initial investment.

Thus, the owner of the information embodied in recordings faced the configuration problem (how many phonograph records are to be manufactured, how many 8-track tapes are to be manufactured and how many reel-to-reel tapes are to be manufactured), and then the owner of such recording information faced the problems of distributing such material objects to retail outlets and attempting to collect for the sale of such material objects.

When the owner of information embodied in recordings initially advertised and otherwise initially commercially exploited a particular recording, there were no assurances that material objects embodying such particular recording would be available at a relatively large percentage of point of sale locations at a time coinciding with the time of the owner's initial advertising campaign. This, of course, resulted in lost potential sales.

The retailers at the various point of sale locations also faced problems with respect to information embodied in recordings. Initially, such retailers faced the problem of determining which recordings were to be stocked and, then, attempting to determine which configurations of such recordings and how many of each such configuration. Inventory represented a substantial investment to such retailers and such retailers also have faced pilferage problems which has resulted in lost revenues. All of these problems of the retailers translated to a large extent to an increased product (material object) cost to the consumer.

One attempt to circumvent some of the problems referred to above relating to the information embodied in recordings has been to market recordings by direct mail, such as accomplished in a record club approach, for example. With the record club approach, the owner of the information attempted to market recordings direct to the consumer in a manner which would tend to reduce the number of recordings sold for which the owner of such information was not compensated. However, this approach still required the owner of the information to manufacture and inventory the material objects (phonograph records and tapes) and thus all of the manufacturing and inventory problems and the costs associated therewith still remained with the record club approach.

One other attempt to circumvent some of the problems referred to above relating to the information embodied in recordings has been for the owner of such information to advertise the recordings on television for direct sale to the consumer. The television advertising direct sale approach had the advantage of almost virtually assuring that the owner of such information would receive compensation for the sale of a particular recording and, to some extent, the television advertising direct sale approach presented an opportunity for the owner of such information to reduce excess inventory problems. However, the cost of such television advertising has been relatively high and the owner of the information has been required to invest this cost without any assurance that a sufficient number of recordings would be sold to permit the owner of such information even to recoup the initial investment in the television advertising. Also, the number of recordings which could be marketed in a single television advertising direct sale campaign has been limited to a single recording in most instances.

Because of economic considerations, it has not been practical for a retailer (point of sale location) to maintain all of the available recordings in inventory at any given time. Thus, a consumer having a desire to purchase a particular recording might not be able to locate a retail outlet (point of sale location) which carried such recording in inventory and this potential sale simply would be lost. This type of a lost sale represented lost revenues to the owner of the information and the owner of the point of sale location.

All of the problems mentioned above with respect to information embodied in recordings has resulted in a substantial increase in the price of material objects (phonograph records and tapes) to the consumer. Since the actual cost of manufacture has been relatively low compared with the retail selling price of the material objects (phonograph records and tapes), this large money difference has attracted unscrupulous individuals and entities to pirate recordings (reproduce without the owner's permission). A majority of the attempts to solve the piracy problems have been directed to legislative solutions. Although helpful, the legislative solutions still have not completely solved the piracy problems. If the retail price of the recordings could be reduced while simultaneously virtually assuring the same compensation to the information owner, this substantially would reduce the economic incentive to pirate recordings. Further, if the problems of manufacturing and distributing information could be solved, this likely would result in a lower retail price to the consumer while maintaining or increasing the compensation to the information owner.

In summary, the problem which has not been solved by the owners of information embodied in recordings has been how to manufacture and distribute material objects embodying the information in an economical and efficient manner and in a manner which virtually assures that the owners of such information will be compensated in connection with the sale of such material objects.

The various problems referred to before with respect to information embodied in recordings also exist with respect to motion picture type information. Motion picture type information has been available to some extent in at least four different configurations: ¾ inch tape cassettes, VHS tape cassettes; Beta-Max tape cassettes; and video discs. Thus, the owners of motion picture type information and the retailers (owners of point of sale locations) distributing material objects embodying motion picture type information have to face configuration, manufacturing, inventory, distribution, collection and piracy problems very similar to the problems faced with respect to information embodied in recordings, discussed generally before.

Also, the manufacturing, distribution, inventory and collection problems generally discussed before with respect to motion picture and recording type information have existed in varying degrees with respect to the owners and retailers of various other types of information, such as software, books, handheld calculators, handheld electronic games, greeting cards, maps, sheet music and the like, for example.

Of course, in the past there have been vending machines capable of dispensing material objects at a point of sale location in response to receiving a deposit of a predetermined amount of money. With these vending machines, the material objects still are manufactured and shipped or transported to the point of sale locations.

Also, in recent years, pay, cable or subscription television has become a popular means for distributing television type information. In some of these systems, the television type information only was delivered to the consumer at the consumer's home (point of sale location) in response to the consumer requesting such information and paying an appropriate amount to the owner of such information. The television type information distributed in this manner was transitory in nature (existed only for transitory period of time at the point of sale location). These systems still did not permit a material object embodying the owner's information to be produced or manufactured at the point of sale in response to the owner's authorization.

The present invention provides a means for reproducing or manufacturing material objects at point of sale locations only with the permission of the owner of the information, thereby assuring that the owner of the information will be compensated in connection with such reproduction. The system of the present invention solves the problems associated with manufacturing, inventory, configuration distribution and collection previously discussed and permits sale of material objects embodying information in a more efficient, economical and profitable manner.

BRIEF DESCRIPTION OF THE DRAWINGS

FIG. 2 is a schematic view of the information control machine portion of the point of sale information manufacturing system shown in FIG. 1.

FIG. 3 is a schematic view of the information manufaturing machine portion of the point of sale information manufacturing system shown in FIG. 1.

FIG. 4 is a schematic view of a modified information manufacturing machine.

DESCRIPTION OF THE PREFERRED EMBODIMENT

Figure 1:
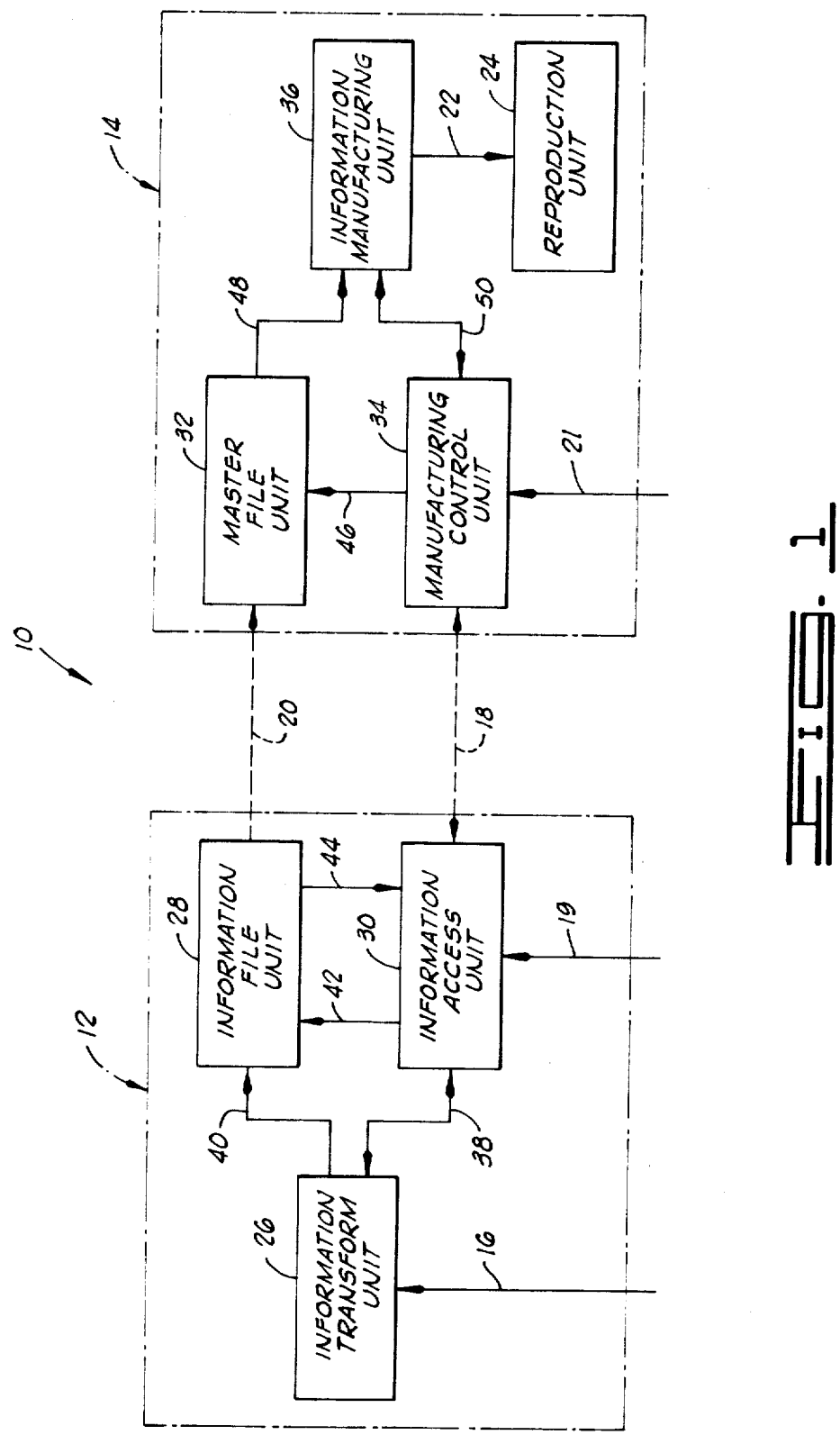
FIG. 1 is a diagrammatic view of the point of sale information manufacturing system of the present invention.

The term "material object" as used herein means a medium or device in which information can be embodied or fixed and from which the information embodied therein can be perceived, reproduced, used or otherwise communicated, either directly or with the aid of another machine or device. For example, a cassette tape is a material object in which information (sounds of an artist's performances of musical compositions) can be embodied or fixed and, using the cassette tape with the aid of cassette player, the information can be communicated or heard. By way of another example, a floppy disk is a material object in which information in the form of programs can be fixed and the program so embodied in the floppy disk can be used with a machine or computer adapted to accept the floppy disk input and use the program (information) embodied therein. Other examples of material objects include phonograph records, 8-track tapes, reel-to-reel tapes, video discs, handheld calculators, handheld electronic games, greeting cards, maps and sheet music. Still other examples of material objects will be apparent to those skilled in the art in view of the foregoing definition when read in conjunction with the description of the preferred embodiment of the invention contained herein.

Shown in FIG. 1 is a point of sale information manufacturing system 10 which is constructed in accordance with the present invention. In general, the point of sale information manufacturing system 10 includes at least one information control machine 12 and a plurality of information manufacturing machines 14, only one information control machine 12 and only one information manufacturing machine 14 are shown in the drawings for clarity.

In general, the information control machine 12 is constructed to receive information via an input line 16, encode the received information, store the encoded information, receive request reproduction codes requesting to reproduce certain preselected information at a particular information manufacturing machine 14 via a communication link 18, provide authorization codes authorizing the reproduction of certain preselected information at a particular information manufacturing machine 14 via the communication link 18, receive file reproduce codes via an input line 19 requesting the reproduction of the information stored in the information control machine 12, provide the information stored therein for communication to particular information manufacturing machines 14 via a communication link 20, receive file transmit codes via the input line 19 requesting the reproduction of the information stored in the information control machine 12, and provide the information stored therein for communication to particular information manufacturing machines 14 via the communication link 18. Each information manufacturing machine 14 is constructed to receive encoded information via the communication link 18 or the communication link 20, store received encoded information, receive request reproduction codes via an input line 21, provide request reproduction codes via the communication link 20, decode preselected information in response to receiving an authorization code and provide certain preselected decoded information via an output line 22 to a reproduction unit 24 which is adapted to reproduce received information in a material object.

Each of the information manufacturing machines 14 is located at a point of sale location and each point of sale location is located remotely with respect to the other point of sale locations in the system 10. The information control machine 12 is located at a remote location with respect to each of the point of sale locations and with respect to the information manufacturing machines 14. In those instances where the system 10 includes more than one information control machine 12, which may be desired in some applications, each of the information control machines 12 could be in a central location or in a location remote with respect to the location of the other information control machines 12. In any event, each information control machine 12 is located at a remote location with respect to each of the point of sale locations. The point of sale location is a location where a consumer goes to purchase material objects embodying predetermined or preselected information.

In general, information is inputted into the information control machine 12, via the input line 16 and the inputted information is encoded and stored in the information control machine 12. The encoded information stored in the information control machines 12 is communicated to the information manufacturing machine 14 via the communication link 18 or the communication link 20 and the received encoded information is stored in each of the information manufacturing machines 14.

When a request is made at a point of sale location for a material object embodying certain selected information, such request is inputted into the information manufacturing machine 14 in the form of a request reproduction code via the input line 21 and, in response to such a request, the information manufacturing machine 14 provides a request reproduction code requesting to reproduce the certain selected information in a material object which is outputted over the communication link 20. The request reproduction code is received by the information control machine 12 on the communication link 20 and, in response to receiving the request code, the information control machine 12, if approved, provides an authorization code on the communication link 20 which is received by the information manufacturing machine 14. In response to receiving the authorization code, the information manufacturing machine 14 decodes the preselected information stored in the information manufacturing machine 14 and provides the decoded information on the ouput line 22. The reproduction unit 24 is constructed and adapted to receive the decoded information provided on the output line 22 and to reproduce the preselected information in a material object. Thus, the information manufacturing units 14 are constructed to reproduce preselected information in material objects only in response to receiving an authorization code and, thus, preselected information is embodied or reproduced in a material object at a point of sale location substantially only with the permission of the owner of the information, such permission being indicated by the authorization code provided by information control machine 12.

As shown in FIG. 1, the information control machine 12 includes an information transform unit 26, an information file unit 28 and an information access unit 30. The information manufacturing machine 14 includes a master file unit 32, a manufacturing control unit 34, information manufacturing unit 36 and the reproduction unit 24.

The information transform unit 26 is constructed to receive information inputted on the input line 16. The information received on the input line 16 may be in an analog format or in a digital format. If the information on line 16 is in an analog format, the information transform unit 26 initially converts the received information from the analog format to a digital format.

The information transform unit 26 has stored therein a plurality of encipher programs. Each of the encipher programs is adapted to encode information in accordance with a predetermined pattern established by the encipher program and each encipher program is uniquely identifiable and locateable via a predetermined select code. The information transform unit 26 is adapted to receive on a signal path 38 select codes uniquely identifying preselected encipher programs and to encode the received information in accordance with a particular encipher program identified by a select code received on the signal path 38. The information transform unit 26 also is constructed and adapted to provide the encoded information in a digital format on the signal path 40.

In a preferred embodiment, the information transform unit 26 also has stored therein a plurality of decipher programs and each decipher program is uniquely adapted to decode or decipher information which has been encoded or enciphered with one of the encipher programs, the select codes uniquely identifying the encipher programs and the corresponding decipher programs. The encipher programs are adapted to encode a decipher program in the information being encoded so that each encoded information has encoded therein a decipher program corresponding to the particular encipher program utilized to encode the information and the decipher program encoded therein, and this encoded information is provided on the signal path 40.

The information transform unit 26 also is constructed and adapted to receive an owner code uniquely identifying the owner of the information being inputted on the input line 16 and a catalog code uniquely identifying the particular information being inputted on the input line 16. The owner code and the catalog code are provided by the information transform unit 26 on the signal path 40 along with the encoded information which includes the decipher program.

The information file unit 28 is constructed and adapted to receive on a signal path 40 the encoded information along with the catalog code uniquely identifying the encoded information and the owner code uniquely identifying the owner of the encoded information and to store the received encoded information and corresponding catalog code and owner code. Each set of information stored in the information file unit 28 is encoded in accordance with one, preselected encipher program and, thus, it is conceivable and it is contemplated by the present invention that each set of information stored in the information file unit 28 will be encoded in accordance with a different encipher program.

The information file unit 28 has a plurality of file encipher programs stored therein and each file encipher program is uniquely identifiable via a file select code. The information file unit 28 also has stored therein a plurality of file decipher programs and each file decipher program is uniquely adapted to decipher or decode information which has been encoded in accordance with one of the file encipher programs, the file select codes uniquely identifying the file encipher programs and the corresponding file decipher programs. The file encipher programs are adapted to encode a file decipher program in the information being encoded so that each encoded information has encoded therein a file decipher program corresponding to the particular file encipher program utilized to encode the information and the file decipher program encoded therein. The information file unit 28 also has stored therein a plurality of catalog decipher programs, each of the catalog decipher programs is adapted to decode the decipher program and the file decipher program encoded in the encoded information stored in the information manufacturing machines 14. In addition, the information file unit 28 has stored therein a plurality of authorization encipher programs, for reasons to be made more apparent below.

The information file unit 28 also is constructed to receive file reproduce commands, file transmit commands and catalog transmit commands on a signal path 42.

In response to receiving a file reproduce command along with a file select code and an IMM code which uniquely identifies one particular information manufacturing machine 14, the information file unit 28 is constructed and adapted to encode the encoded information stored therein in accordance with the file encipher program uniquely identified by the received file select code and, simultaneously, to encode therein the file decipher program identified by the received file select code for deciphering the encoded information, and to provide this encoded information along with the IMM code on the communication link 20 for communication to the information manufacturing machine 14 uniquely identified by the received IMM code. Thus, the encoded information provided on the communication link 20 in response to a received file reproduce command includes all of the information stored in the information file unit 28 and this information has been encoded using one selected encipher program before being stored in the information file unit 28 and has been encoded again using one selected file encipher program before being provided on the communication link 20. The encoded information provided on the communication link 20 in response to a received file reproduce command is double encoded or encoded twice and includes the decipher program and the file decipher program encoded therein.

In response to receiving a file transmit command along with a file select code and an IMM code, the information file unit 28 is constructed and adapted to encode the encoded information stored therein in accordance with the file encipher program uniquely identified by the received file select code and, simultaneously, to encode therein the particular file decipher program identified by the received file select code for deciphering the encoded information, and to provide the encoded information along with the IMM code on a signal path 44. The information provided on the signal path 44 in response to a received file transmit command thus is double encoded in a manner like that described before with respect to the file reproduce command. The information access unit 30 is constructed and adapted to receive the encoded information provided on the signal path 44 in response to the file transmit command along with the IMM code and to provide the received encoded information along with the IMM code on the communication link 18.

The information file unit 28 stores the file select codes along with the associated IMM codes after communicating the encoded information stored therein in response to a file reproduce command or a file transmit command. It is contemplated that the information communicated to each information manufacturing machine 14 will be encoded in accordance with a different file encipher program. Thus, the encoded information stored in one information manufacturing machine 14 will not be useable in another information manufacturing machine 14, as an additional security measure.

As described before, the information file unit 28 is adapted to communicate all of the information stored therein in response to receiving a file reproduce command or a file transmit command. It will be apparent to those skilled in the art that the information file unit 28 also could be adapted to communicate only selected information stored therein in response to receiving a file reproduce command or a file transmit command if desired in a particular application.

In response to receiving a catalog transmit command along with a catalog code and an IMM code on the signal path 42, the information file unit 28 is constructed and adapted to determine the particular decipher program and the particular file decipher program which correspond respectively to the particular encipher program and the particular file encipher program which is utilized to encode the information communicated to the particular information manufacturing machine 14 uniquely identified by the received IMM code. After determining the particular decipher program and the particular file decipher program, the information file unit 28 then determines the catalog decipher program for decoding the decipher program and the file decipher program encoded in the encoded information identified by the received catalog code and stored in the particular information manufacturing machine 14 identified by the received IMM code, and the information file unit 28 encodes the catalog decipher program and the catalog code in accordance with one predetermined authorization encipher program, the encoded catalog decipher program, the encoded catalog code and the IMM code comprising the authorization code. The information file unit 28 provides the authorization code (the encoded catalog decipher program and the encoded IMM code) on the signal path 44. The information access unit 28 receives the authorization code, and communicates the authorization code on the communication link 18.

The information access unit 30 is constructed and adapted to receive on the input line 19 owner codes, catalog codes and select codes and to provide the owner codes, the catalog codes and the select codes on the signal path 38 for encoding and storing information being received on the input line 16. The information access unit 30 also is constructed and adapted to receive on the input line 19 file select codes, IMM codes, catalog reproduce codes and catalog transmit codes and to provide the received file select codes, IMM codes, catalog reproduce commands and catalog transmit commands on the signal path 42 for reception by the information file unit 28. The information access unit 30 is constructed and adapted to receive IMM codes, catalog codes, encoded information and file transmit commands on the signal path 44 for communication of the encoded information stored in the information control machine 12 to information manufacturing machines 14 over the communication link 18. The information access unit 30 is constructed and adapted to receive on the communication link 18 request reproduction codes, which include catalog codes and IMM codes, and, after approval of the request reproduction, the information access unit 30 provides the catalog code, the IMM code, and a request reproduction command on the signal path 42. The information access unit 30 is constructed and adapted to receive catalog transmit commands and authorization codes on the signal path 44 and to transmit the received authorization codes over the communication link 18.

The master file unit 32 is constructed to function as a permanent storage unit. The master file unit 32 is constructed and adapted to receive encoded information along with the catalog codes uniquely identifying the encoded information over the communication link 18. In one other mode, the master file unit 32 receives encoded information and the catalog codes on a signal path 46. The master file unit 32 stores the received encoded information and the catalog codes.

The manufacturing control unit 34 is constructed to receive request reproduction codes which include IMM codes and catalog codes via the input line 21 and to communicate the received request reproduction codes over the communication link 20 for reception by the information control machine 12. The manufacturing control unit 34 has a pluurality of authorization decipher programs stored therein and each authorization decipher program is uniquely identifiable via an authorization select code. The manufacturing control unit 34 is constructed and adapted to receive authorization codes which include IMM codes, encoded catalog codes, encoded catalog decipher programs and encoded authorization select codes over the communication link 20. The manufacturing control unit 34 is constructed and adapted to decipher or decode a received encoded catalog code, encoded catalog decipher program and encoded authorization select code in accordance with one, predetermined authorization decipher program and to decipher or decode the next received encoded catalog code, encoded catalog decipher program and encoded authorization select code in accordance with the authorization decipher program uniquely identified by the previously, last received authorization select code.

After decoding the received encoded catalog code, the encoded catalog decipher program and the encoded authorization select code, the manufacturing control unit 34 stores the authorization select code for use in deciphering the next received encoded catalog code, encoded catalog decipher program and encoded authorization select code. Then, the manufacturing control unit 34 is constructed and adapted to provide the decoded catalog code on a signal path 46 for reception by the master file unit 32. In response to receiving the catalog code on the signal path 46, the master file unit 32 provides the encoded information uniquely identified by the received catalog code on a signal path 48 for reception by the information manufacturing unit 36. The information manufacturing unit 36 is constructed and adapted to receive and temporarily store the received encoded information.

The information manufacturing unit 36 is constructed and adapted to provide the encoded information temporarily stored therein on the signal path 50 while maintaining the encoded information temporarily stored in the inforamtion manufacturing unit 36. The manufacturing control unit 34 decodes the decipher program and the file decipher program from the encoded information utilizing the catalog decipher program and the manufacturing control unit 34 then temporarily stores the decoded decipher program and the decoded file decipher program.

After decoding and storing the decipher program and the file decipher program, the manufacturing control unit 34 is constructed and adapted to decode the encoded information utilizing or in accordance with the decipher program and the file decipher program and to provide the decoded information on the signal path 50 for reception by the information manufacturing unit 36. The information manufacturing unit 36 is constructed and adapted to receive the decoded information which is in a digital format, on the signal path 50 and to convert the information to an analog format, the information in an analog format being provided on the signal path 22. The reproduction unit 24 is constructed and adapted to receive the information in an analog format on the signal path 22 and to reproduce the received information in a material object.

After providing the decoded information for reproduction, the manufacturing control unit 34 then receives the encoded information from the information manufacturing unit 36 over the signal path 50 and provides the encoded information on the signal path 46 to be received by and restored in the master file unit 32. In one embodiment, the manufacturing control unit 34 also has stored therein a plurality of encipher programs and a plurality of file encipher programs and the manufacturing control unit 34 determines the particular encipher program and the particular file encipher program initially utilized to encode the information from the decoded decipher program and the decoded file decipher program, the manufacturing control unit 36 being constructed and adapted to re-encode the information utilizing the determined encipher program and file encipher program, thereby re-encoding the inforamtion in a manner exactly like the information was encoded intially. In this last mentioned embodiment, the re-encoded information then is provided on the signal path 46 for reception by and storage in the master file unit 32.

It should be noted that the information manufacturing machine 14 also could be adapted to encode the information utilizing different encipher programs and different file encipher programs selected by the information control machines 12 by incorporation of appropriate codes in the authorization code. This would constitute an additional security measure which may be desirable in some applications.

The operation of the system 10 shown in FIG. 1 will be generally described just below with respect to information embodied in recordings; however, it will be understood that such operation applies equally with respect to the various other categories of information and material objects referred to herein.

Initially, it is necessary to get the recordings (information) into the system 10. In most instances, original recordings are in an analog form; however, the information embodied in recordings also may be in a digital form. To input particular, preselected recordings into the information control machine 12, an individual or a machine identifies the certain preselected recording, such as a record album or the performance of a single song by a particular recording artist, for example, with a predetermined catalog code, which might correspond to a single record or album catalog number, for example, and the individual or machine then selects (which may be on a random selection basis or in accordance with some predetermined program) one particular, preselected select code. The catalog code, the select code and the owner code which uniquely identifies the owner of the particular recording being inputted into the information control machine 12 then are inputted into the information access unit 16, and the corresponding information embodied in the particular recording is inputted into the information transform unit 26 via the input line 16.

Assuming the information embodied in the recording is in an analog format, the information transform unit 26 initially converts the received information into a digital format. The owner code, the catalog code and the select code are received by the information transform unit 26 from the information access unit 30 on the signal path 38, and the information transform unit 26 encodes the received information according to the encipher program uniquely identified by the received select code, the information transform unit 26 also simultaneously encoding the decipher program identified by the select code in the received information. The encoded information with the decipher program encoded therein along with the catalog code and the owner code then are stored in the information file unit 28. It is contemplated that virtually all of the existing recordings or, in one other form, all of the recordings of a particular owner, such as RCA or CBS Records, for example, will be entered into and stored in the information control machine 12 in the manner just generally described.

There are a plurality of information manufacturing machines 14 in the system 10 and each information manufacturing machine 14 is uniquely identified via an IMM code. To transfer the encoded information in the information file unit 28 to the master file unit 32 of one of the information manufacturing machines 14, a file reproduce code, an IMM code and a file select code initially are inputted into the information access unit 30 via the input line 19 and the information access unit 30 provides the file reproduce command, the IMM code and the file select code on the signal path 42 for reception by the information file unit 28. The information file unit 28 encodes the information stored therein in accordance with the file encipher program identified via the received file select code and, simultaneously, encodes the particular file decipher program identified by the received file select code in the information for later use in deciphering the encoded information. The encoded information along with the corresponding catalog codes are communicated to the information manufacturing machine 14 identified by the IMM code via the communication link 20 for storage in the master file unit 32 of the information manufacturing machine 14.

Thus, the information stored in each information manufacturing machine 14 is encoded first in accordance with preselected encipher programs and then the encoded information is encoded again in accordance with a preselected file encipher program, the encoded information in each information manufacturing unit 14 being encoded in accordance with a different, preselected file encipher program. The information control machine 12 has stored therein the encipher program and the corresponding decipher program, the file encipher program and the corresponding file decipher program and the IMM code so the information control machine 12 retains in memory the file encipher program which was utilized to encode the encoded information for storage in each of the information manufacturing machines 14.

In the alternative, all of the information stored in the information control machine 12 can be transferred or communicated to the information manufacturing machines 14 via the communication link 18. In this mode of operation, a file transmit code, an IMM code and a file select code initially are inputted into the information access unit 30 via the input line 19 and the information access unit 30 provides the catalog transmit command, the IMM code and the file select code on the signal path 42 for reception by the information file unit 28. The information file unit 28 encodes the information stored therein and identified by the received catalog code in accordance with the file encipher program identified via the received file select code and, simultaneously, encodes the particular file decipher program identified by the received file select code in the information for later use in deciphering the encoded information, and the encoded information along with the corresponding catalog codes and the file transmit command are provided on the signal path 44 for reception by the information access unit 30 which communicates encoded information along with the corresponding catalog codes identified by the IMM code via the communication link 18 for reception by the manufacturing control unit 34 of the information manufacturing machine 14. The manufacturing control unit 34 provides the received encoded information and catalog codes on the signal path 46 for reception by and storage in the master file unit 32.

As described, one file encipher program was selected to encode all of the encoded information for storage in one of the information manufacturing machines 14. It should be noted that the manufacturing control machine 12 also could be adapted to encode each encoded information identified by a catalog code in accordance with a different file encipher program if desired in a particular application.

Each point of sale location has at least one information manufacturing machine 14, at least one reproduction unit 24 and a plurality of blank material objects.

Referring to the example involving information embodied in recordings, each point of sale location would have a plurality of blank 8-track tapes or blank cassettes types of material objects, for example, and the reproduction unit 24 would be adapted to record the received decoded information on a blank 8-track tape or cassette tape operatively disposed therein. In addition, each point of sale location would include a number of printed catalogs describing or otherwise identifying the various recordings available along with the catalog codes uniquely identifying each available recording for the consumers to select the recording desired to be purchased.

When a consumer selects a particular record album for purchase, for example, the catalog code and the IMM code are inputted into the manufacturing control unit 34 via the input line 21. The manufacturing control unit 34 provides over the communication link 20 the request reproduction code (including the catalog code and the IMM code) requesting to reproduce the certain, selected recording identified by the catalog code, such request reproduction code being received by the information access unit 30 of the information control machine 12.

It should be noted that additional data also can be communicated in connection with request reproduction codes. For example, a consumer credit card number also might be communicated with each request reproduction code so the owner of the information could approve the sale and, in effect, charge the sale to the consumer credit card number. If a consumer desired to pay cash, the owner of the point of sale location could input the owner's credit card number so the owner of the information could approve the sale and, in effect, charge the sale to the credit card number of the owner of the point of sale location. In this manner, the owner of the information receives directly the compensation for each sale of a recording and such compensation is received before the reproduction is authorized. The owner of the point of sale location would collect from the consumer compensation for the blank material object (8-track tape or cassette tape, for example) and this would be a sales transaction independent of the owner of the information. Also, it should be noted that various other data could be inputted into the manufacturing control unit 34 in connection with a request reproduction code for inventory of material objects control or other general accounting data, if desired.

The information access unit 30 is adapted to receive and approve the request reproduction code, such approval constituting credit approval, for example, and to provide a request reproduction command, along with the requested or selected catalog code and IMM code on the signal path 42 for reception by the information file unit 28. In response, the information file unit 28 determines the catalog decipher program which will decode the decipher program and the file decipher program from the encoded information identified by the received catalog code and IMM code.

The information file unit 28 determines and generates an authorization code which includes the IMM code, the catalog code, the catalog decipher program, and an authorization select code. Stored in the memory of the information file unit 28 is identity of the particular authorization decipher program which the particular information manufacturing machine 14 identified by the received IMM code has been programmed to utilize in deciphering the next authorization code to be received by such particular information manufacturing machine 14. The information file unit 28 determines the particular authorization encipher program corresponding to the particular authorization decipher program to be utilized by the information manufacturing machine 14 identified by the received IMM code, and the information file unit 28 encodes the authorization code according to this predetermined authorization encipher program. It should be noted that the IMM code portion of the authorization code is not encoded in a preferred form. The information file unit 28 provides the encoded authorization code on the signal path 44 along with a catalog transmit command for reception by the information access unit 30 which communicates the encoded authorization code over the communication link 18.

The manufacturing control unit 34 of the information manufacturing machine 14 identified by the IMM code in the authorization code receives the authorization code and decodes the authorization code in accordance with the preselected authorization decipher program. The IMM code provides a means for the information manufacturing machine 14 to determine if a particular message is intended to be received by that particular information manufacturing machine 14. The manufacturing control unit 34 then stores the authorization select code identifying the particular authorization decipher program to be utilized in deciphering the next received authorization code.

The manufacturing control unit 34 then provides the decoded catalog code on the signal path 46 for reception by the master file unit 32. In response to receiving the catalog code, the master file unit 32 provides the encoded information indentified by the received catalog code on the signal path 48 for reception by and temporary storage in the information manufacturing unit 36.

The manufacturing control unit 34 receives the encoded information from the master file unit 36 on the signal path 50 and the manufacturing control unit 34 decodes or deciphers the decipher program and the file decipher program from the encoded information. Utilizing the decoded decipher program and file decipher program, the manufacturing control unit 34 then decodes the encoded information and provides the decoded information on the signal path 50 for reception by the information manufacturing unit 36.

The decoded information received by the information manufacturing unit 36 is in a digital format and, initially, the information manufacturing unit 36 converts the decoded information into an analog format, the decoded information in an analog format being provided on the output line 22 for reception by the reproduction unit 24 which reproduces the received information in a material object such as an 8-track tape or a cassette tape.

In this example, the retail outlet, the point of sale location, has one or more information manufacturing machines 14 and an inventory of blank 8-track tape or cassette tape. The retail outlet, utilizing the system 10 of the present invention, also has in inventory all available recordings; however, this inventory is encoded and not useable without the permission of the owner of the information. The retail outlet does not have in inventory a number of premanufactured recordings which cannot be sold and the retail outlet, in fact, has virtually no investment in inventory, other than the blank 8-track tapes or blank cassette tapes. The owner of the retail outlet only pays for recordings sold.

Further, in this example, the owner of the recordings does not have any investment in cassette tapes or 8-track tapes or, in other words, no inventory of premanufactured recordings. Further, there is no investment in large manufacturing facilities to manufacture recordings since, in the system 10, the recordings are manufactured at the point of sale location only when such recording is sold. Also, in this example, the owner of the recording receives compensation for the sale of a recording before the reproduction and sale of the recording is authorized.

It should be noted that the owner of recordings usually has obligations to pay recording artists and songwriters in connection with the sale of recordings embodying the performances of such recording artists or using musical compositions composed by such songwriters. Utilizing the system 10, the information access unit 30 can be programmed to credit the account of the appropriate recording artist and the appropriate songwriter or publisher each time a particular recording is authorized to be reproduced, which should reduce the accounting problems traditionally encountered in this area.

After all of the encoded information has been stored in the information manufacturing machines 14, additional recordings or, in other words, additional information will be produced. This information is stored in the information file unit 28 in the manner described before with respect to encoding and storing information in the information file unit 28. Further, this additional information is encoded and communicated to the information manufacturing machines 14 in a manner like that described before.

By way of example, assume an additional recording or information is produced after all of the encoded information has been communicated to and stored in the information manufacturing machines 14. This additional recording or information is inputted into, encoded and stored in the information control machine 12 in a manner exactly like that described before.

To communicate this additional recording or information to the information manufacturing machines 14, the catalog code and a catalog reproduce code is inputted into the information access unit 30 which provides the catalog code and a catalog reproduce command on the signal path 42 for reception by the information file unit 28. In response to receiving the catalog code and the catalog reproduce command, the information file unit 28 determines the file encipher program utilized to encode the information for each of the information manufacturing machines 14. Then, in sequence, and for each information manufacturing machine 14, the information file unit 28 encodes the encoded information identified by the received catalog code in accordance with the predetermined file decipher program and provides the encoded information along with the IMM code on the communication link 20 for communication to and storage in the various information manufacturing machines 14.

In the alternative, the additional information or additional recording is communicated to the information manufacturing machines 14 via the communication link 18 by inputting the catalog code and a catalog transmit code into the information access unit 30. The information access unit 30 provides the catalog code and a catalog transmit command on the signal path 42 for reception by the information file unit 28. In response to receiving the catalog code and the information transmit command, the information file unit 28 determines the file encipher program utilized to encode the information for each of the information manufacturing machines 14 and the corresponding IMM codes identifying the information manufacturing machines 14. Then, in sequence and for each information manufacturing machine 14, the information file unit 28 encodes the encoded information identified by the received catalog code in accordance with the predetermined file encipher program and provides the encoded information along with the IMM code on the communication link 18 for communication to and storage in the various information manufacturing machines 14.

Thus, utilizing the system 10 of the present invention, a recording can be completed, and that same day the recording can be communicated to all of the information manufacturing machines 14 to be available for sale to consumers.

From the foregoing, it will be apparent to those skilled in the art that all of the information stored in the information file unit 28 is communicated to the information manufacturing machines 14 utilizing the file reproduce codes and commands and the file transmit codes and commands, and particular information identified by a catalog code is communicated to the information manufacturing machines 14 utilizing the catalog reproduce codes and commands and the catalog transmit codes and commands.

The information control machine 12 of the present invention is shown in more detail in FIG. 2. As shown in FIG. 2, the information transform unit 26 includes an analog to digital converter 60 and a digital information file generator 62. In response to receiving a convert command on a signal path 64, the digital to analog converter 60 is adapted to receive information in an analog format on the input line 16 and to convert the received information to a digital format, the information in a digital format being provided by the analog to digital converter 60 on a signal path 66 for reception by the digital information file generator 62. In response to receiving a non-convert command the analog to digital converter 60 merely provides the received information in a digital format on the output signal path 66, this mode of operation being applicable when the information being received on the input line 16 is in a digital format.

The digital information file generator 62 has stored therein the encipher programs and the decipher programs and each of the stored encipher program and corresponding decipher program is uniquely identifiable via a predetermined select code in the manner described before. The digital information file generator 62 is constructed and adapted to receive information in a digital format on the signal path 66 and to receive the owner code, the catalog code and the select code on the signal path 38.

The digital information file generator 62 encodes the information received in a digital format on the signal path 66 in accordance with the encipher program identified by the received select code and encodes in the information the corresponding decipher program identified by the received select code, and provides the encoded information, the catalog code and the owner code on the signal path 40 for reception by the information file unit 28.

The information file unit 28 includes a digital file storage 68, a control reproduction unit 70 and a control manufacturing unit 72. The digital file storage 68 is constructed to receive the encoded information along with the corresponding catalog codes and owner codes on the signal path 40 from the information transform unit 26 and to store such received encoded information in permanent storage.

The control manufacturing control unit 72 has the file encipher programs, the file decipher programs, the catalog decipher programs and the authroization encipher programs stored therein. In one mode of operation, the manufacturing control unit 72 is constructed and adapted to receive the file select code, the IMM code and a file reproduce command on the signal path 42 from the information access unit 30. In response to receiving the file select, the IMM code and the file reproduce command, the control manufacturing unit 72 sends commands to the digital file storage 68 on a signal path 74 and, in response to receiving such commands, the encoded information stored in the digital file unit 68 along with the catalog codes are provided on the signal path 74 for reception by the control manufacturing unit 72. The control manufacturing unit 72 encodes the received encoded information in accordance with the file encipher program uniquely identified by the received file select code and provides the double encoded information along with the catalog code on a signal path 76 for reception by the control reproduction unit 70, the control manufacturing unit 72 also providing a reproduce command and the IMM codes on the signal path 76. The file encipher programs are each adapted to encode the corresponding file decipher program in the information. All of the encoded information stored in the digital file storage 68 is encoded in the manner just described and provided on the signal path 76 for reception by the control reproduction unit 70.

The control reproduction unit 70 is constructed and adapted to communicate over the communication link 20 the received double encoded information to the information manufacturing machine 14 identified by the received IMM code and, thus, all of the information stored in the digital file storage 68 is communicated to each of the information manufacturing machines 14 in the manner just described, each information manufacturing machine 14 receiving information which has been encoded in accordance with a different file encipher program as compared to the file encipher programs utilized to encode the information communicated to the other information manufacturing machines 14 in the system 10. The control manufacturing unit 72 stores the IMM codes along with the respective file select codes for use in deciphering the encoded information stored in the information manufacturing machines 14.

In another mode of operation, the manufacturing control unit 72 is constructed and adapted to receive the file select code, the IMM code and a file transmit command on the signal path 42 from the information access unit 30. In response to receiving the file select code, the IMM code and the file transmit command, the control manufacturing unit 72 sends commands to the digital file storage 68 on a signal path 74 and, in response to receiving such commands, the encoded information stored in the digital file unit 68 along with the catalog codes are provided on the signal path 74 for reception by the control manufacturing unit 72. The control manufacturing unit 72 encodes the received encoded information in accordance with the file encipher program uniquely identified by the received file select code, the file decipher program also being encoded in the information, and provides the double encoded information along with the catalog code on the signal path 44 for reception by the information access unit 30, the control manufacturing unit 72 also providing a transmit command and the IMM codes on the signal path 44. All of the encoded information stored in the digital file storage 68 is encoded in the manner just described and provided on the signal path 44 for reception by the information access unit 30. The information access unit 30 is constructed and adapted to communicate over the communication link 18, the received double encoded information to the information manufacturing machine 14 identified by the received IMM code and, thus, all of the information stored in the digital file storage 68 is communicated to each of the information manufacturing machines 14 in the manner just described, each information manufacturing machine 14 receiving information which has been encoded in accordance with a different file encipher program as compared to the file encipher programs utilized to encode the information communicated to the other information manufacturing machines 14 in the system 10. The control manufacturing unit 72 stores the IMM codes along with the respective file select codes for use in deciphering the encoded information stored in the information manufacturing machines 14.

The control manufacturing unit 72 also is constructed and adapted to catalog reproduce commands, catalog transmit commands, catalog codes and IMM codes.

In response to receiving a catalog transmit command along with a catalog code and an IMM code on the signal path 42, the control manufacturing unit 72 is constructed and adapted to determine the particular decipher program and the particular file decipher program which correspond respectively to the particular encipher program and the particular file encipher program which is utilized to encode the information communicated to the particular information manufacturing machine 14 uniquely identified by the received IMM code. After determining the particular decipher program and the particular file decipher program, the control manufacturing unit 72 then determines the catalog decipher program for decoding the decipher program and the file decipher program encoded in the encoded information identified by the received catalog code and stored in the particular information manufacturing machine 14 identified by the received IMM code, and the control manufacturing unit 72 encodes the catalog decipher program and the catalog code in accordance with one predetermined authorization encipher program, the encoded catalog decipher program, the encoded catalog code and the IMM code comprising the authorization code. The control manufacturing unit 72 provides the authorization code (the encoded catalog decipher program and the encoded IMM code) on the signal path 44. The information access unit 28 receives the authorization code, and communicates the authorization code on the communication link 18.

In response to receiving a catalog reproduce command along with a catalog code and an IMM code on the signal path 42, the control manufacturing unit 72 is constructed and adapted to determine the particular decipher program and the particular file decipher program which correspond respectively to the particular encipher program and the particular file encipher program which is utilized to encode the information communicated to the particular information manufacturing machine 14 uniquely identified by the received IMM code. After determining the particular decipher program and the particular file decipher program, the control manufacturing unit 72 then determines the catalog decipher program for decoding the decipher program and the file decipher program encoded in the encoded information identified by the received catalog code and stored in the particular information manufacturing machine 14 identified by the received IMM code, and the control manufacturing unit 72 encodes the catalog decipher program and the catalog code in accordance with one predetermined authorization encipher program, the encoded catalog decipher program, the encoded catalog code and the IMM code comprising the authorization code. The control manufacturing unit 72 provides the authorization code (the encoded catalog decipher program and the encoded IMM code) on the signal path 76 for reception by the control reproduction unit 70 which communicates the received encoded authorization code on the communication link 20.

The information access unit 30 includes a communication modem 80 and an information access control unit 82.

The information access control unit 82 is constructed and adapted to receive on the input line 19 owner codes, catalog codes and select codes and to provide the owner codes, the catalog codes and the select codes on the signal path 38 for encoding and storing information being received on the input line 16. The information access control unit 82 also is constructed and adapted to receive on the input line 19 file select codes, IMM codes, catalog reproduce codes and catalog transmit codes and to provide the received file select codes, IMM codes, catalog reproduce commands and catalog transmit commands on the signal path 42 for reception by the information file unit 28. The communication modem 80 is constructed and adapted to receive IMM codes, catalog codes, encoded information and file transmit commands on the signal path 44 for communication of the encoded information stored in the information control machine 12 to information manufacturing machines 14 over the communication link 18. The communication modem 80 is constructed and adapted to receive on the communication link 18 request reproduction codes, which include catalog codes and IMM codes, and, to provide the received request reproduction codes on a signal path 87 for reception by the information access control unit 82. After approval of the request reproduction codes, the information access control unit 82 provides the catalog code, the IMM code, and a request reproduction command on the signal path 42. The communication modem 80 is constructed and adapted to receive catalog transmit commands and authorization codes on the signal path 44 and to transmit the received authorization codes over the communication link 18.

As shown in FIG. 3, the master file unit 26 includes a reader 84 and a digital storage unit 86. The digital storage unit 26 is constructed to function as a permanent storage unit. The reader 84, in response to a command received from the manufacturing control unit 34 on the signal path 46, is constructed and adapted to receive encoded information along with the catalog codes uniquely identifying the encoded information over the communication link 20, and to provide the received encoded information and catalog codes in a digital format on a signal path 88 for reception by the digital storage unit 86. In one other mode, the digital storage unit 86 receives encoded information and the catalog codes on a signal path 46. The digital storage unit 86 stores the received encoded information and the catalog codes.

As shown in FIG. 3, the manufacturing control unit 34 includes a communication modem 88, an information catalog and request unit 90 and a manufacturing program unit 92. The information catalog and request unit 90 is constructed to receive request reproduction codes which include IMM codes and catalog codes via the input line 21 and to communicate the received request reproduction codes on a signal path 94 through the communication modem 88 and over the communication link 18 for reception by the information control machine 12.

The manufacturing program unit 92 has a plurality of the authorization decipher programs stored therein and each authorization decipher program is uniquely identifiable via an authorization select code. The manufacturing program unit 92 is constructed and adapted to receive from the information catalog and request unit 90 authorization codes which include IMM codes, encoded catalog codes, encoded catalog decipher programs and encoded authorization select codes over the communication link 18 through the communication modem 88, the signal path 94 and a signal path 93, the information catalog and request unit and a signal path 96. The manufacturing program unit 92 is constructed and adapted to decipher or decode a received encoded catalog code, encoded catalog decipher program and encoded authorization select code in accordance with one, predetermined authorization decipher program and to decipher or decode the next received encoded catalog code, encoded catalog decipher program and encoded authorization select code in accordance with the authorization decipher program uniquely identified by the previously, last received authorization select code.

After decoding the received encoded catalog code, the encoded catalog decipher program and the encoded authorization select code, the manufacturing program unit 92 stores the authorization select code for use in deciphering the next received encoded catalog code, encoded catalog decipher program and encoded authorization select code. Then, the manufacturing program unit 92 is constructed and adapted to provide the decoded catalog code on a signal path 46 for reception by the digital storage unit 86. In response to receiving the catalog code on the signal path 46, the digital storage unit 86 provides the encoded information uniquely identified by the received catalog code on the signal path 48 for reception by the information manufacturing unit 36.

The information manufacturing unit 36 includes a digital information unit 98 and a digital to analog converter unit 100. The digital information unit 98 is constructed and adapted to receive on the signal path 48 and temporarily store the received encoded information.

The digital information unit 98 is constructed and adapted to provide the encoded information temporarily stored therein on the signal path 50 while maintaining the encoded information temporarily stored in the digital information unit 98. The manufacturing program unit 92 decodes the decipher program and the file decipher program from the encoded information utilizing the catalog decipher program and the manufacturing program unit 92 then temporarily stores the decoded decipher program and the decoded file decipher program.

After decoding and storing the decipher program and the file decipher program, the manufacturing program unit 92 is constructed and adapted to decode the encoded information utilizing or in accordance with the decipher program and the file decipher program and to provide the decoded information on the signal path 50 for reception by the digital information unit 98. The digital information unit 98 is constructed and adapted to receive the decoded information, which is in a digital format, on the signal path 50 and to provide the decoded information in a digital format on the signal path 102 for reception by the digital to analog converter 100.

The manufacturing program unit 92 provides the convert command on a signal path 106 for reception by the digital to analog converter 100. The digital to analog converter 100, in response to receiving the convert command, is constructed and adapted to convert the information to an analog format, the information in an analog format being provided on the signal path 22 for reception by the reproduction unit 24, which reproduces the received information in a material object.

After providing the decoded information for reproduction, the manufacturing program unit 34 then receives the encoded information from the digital information unit 98 over the signal path 50 and provides the encoded information on the signal path 46 to be received by and restored in the digital storage unit 32. In one embodiment, the manufacturing program unit 92 also has stored therein a plurality of encipher programs and a plurality of file encipher programs and the manufacturing program unit 92 determines the particular encipher program and the particular file encipher program initially utilized to encode the information from the decoded decipher program and the decoded file decipher program, the manufacturing program unit 92 being constructed and adapted to re-encode the information utilizing the determined encipher program and file encipher program, thereby reencoding the information in a manner exactly like the information was encoded intially. In this last mentioned embodiment, the re-encoded information then is provided on the signal path 46 for reception by and storage in the digital storage file unit 34.

In a preferred embodiment, the control reproduction unit 70 is constructed and adapted to reproduce the received encoded information in a tangible medium such as a floppy disk or tape or video disk, for example. The tangible mediums embodying the encoded information then are physically transferred (delivered by mail or such form of delivery, for example) to the location of the information manufacturing machines 14 so the encoded information stored therein can be transferred to the various information manufacturing machines 14. The form of communication just described is the form of communication contemplated by the communication contemplated by the communication link 20. In a preferred embodiment, the communication link 18 is a transmission type of communication such as a transmission over the airways or via telephone lines or via television cables, for example. Thus, the encoded information is communicated over the communication link 20 to the information machines 14 by first embodying the encoded information in a tangible medium utilizing the control reproduction unit 70 and then physically transferring the tangible mediums to the respective information manufacturing machines 14 or the encoded information is transmitted to the various information manufacturing machines 14 over the communication link 18.

Reproduction units such as the control reproduction unit 70 which are capable of receiving information in a digital format and reproducing such information in a digital form on tape or a video disk or a floppy disk are well known in the art.

The digital information file generator 62 may be a hard disk Corvus Model No. AT20 operating in conjunction with an Apple II Plus computer, for example. The information access control unit 82 may be an Apple II monitor, for example. The digital file storage 68 may be a hard disk Corvus Model No. AT20, for example. The control manufacturing unit 72 may be an Apple III computer, for example. The communication modem 80 may be a Bell modem Model No. 801 which can be interfaced via a Bell controller card Model No. HDW1907 to the Apple II monitor (the information access control unit 82) and the Apple III computer (the control manufacturing unit 72). The analog to digital converter 60 may be a National Semiconductor converter, Model No. BLC-8737, for example, which is controlled by the information access control unit 82 via the signal path 64.

The information catalog and request unit 90 may be an Apple II monitor Model No. A3M00039, for example. The communication modem 88 may be a Bell modem Model No. 801 which can be interfaced via a Bell controller card Model No. HDW1907 to the Apple II monitor (the information catalog and request unit 90) and the manufacturing program unit 92. The manufacturing program unit 92 may be Apple III computer, for example. The digital storage unit 86 may be a hard disk Corvus Model No. A720 and the digital information unit 98 also may be a hard disk Corvus Model No. A720. The digital to analog converter 100 may be a National Semiconductor converter Model No. BLC-8737, for example, which is controlled by the manufacturing program unit 92 via a signal path 106. Readers, such as the reader 84 which are capable of reading information in a digital format from a disk or tape are well known in the art. Reproduction units, like the reproduction unit 24, which are capable of receiving information in an analog form and reproducing at relatively high speeds such information in tape (8-track tapes or cassette tapes, for example) are well known in the art.

The reproduction units 24 would be high speed printers, which are well known in the art, in the case where the information to be produced is printed material such as song sheets, books, greeting cards or the like. The reproduction units 24 would be electronic machines capable of programming memories in microprocessors in those instances where the material object is a hand-held calculator, for example. The reproduction units 24 would be electronic machines capable of transferring programs in digital format onto floppy disks or other such storage media when the information to be reproduced is in the form of a computer program. From the foregoing detailed description, other types of reproduction units capable of reproducing other forms of information at a point of sale location will be apparent to those skilled in the art.

The present invention contemplates at least one information manufacturing machine 14 which is located at each point of sale location. Further, the present invention also contemplates a plurality of reproduction units 24 connected to the digital to analog converter 100, with each reproduction unit 24 being capable of reproducing the receiving information in different material object forms, such as printers, programming electronic machines, electronic machines capable of transferring programs in a digital format onto floppy disks or other such storage media, cassette tape reproducing machines, 8-track tape reproducing machines and reel-to-reel tape reproducing machines, for example.

In this last-mentioned embodiment, a format code uniquely identifying the type of material object to embody the information also is inputted into the information catalog and request unit 90 along with the catalog code. The format code is received by the manufacturing program unit 92 via the signal path 93 and the manufacturing program unit 92 is programmed to provide a format command to the digital to analog converter 100 via the signal path 106. In response to receiving the format command, the digital to analog converter converts the received information into the specific analog format which is receivable and useable by the particular reproduction unit 24 for reproducing information in the particular material object identified via the inputted format code. For example, the inputted format code may identify that the requested information identified by the catalog code is to be reproduced in a sheet music form. In this example, the format command received the digital to analog converter 100 causes the digital to analog converter 100 to output the received information on the signal path 22 in an analog format suitable for receipt by a printer type reproduction unit 24 for producing the information in a printed sheet music type material object.

Programs are available in various program language formats as is well known in the art. The manufacturing program unit 92 also is programmed to control the digital to analog converter 100 so that information in the form of a program is outputted in a particular program language identified via the inputted format code and the format command resulting therefrom. Thus, an individual at a point of sale can request that a certain program identified by the inputted catalog code be reproduced on a floppy disk in a particular program language identified via the inputted format code.

The encipher programs, the file encipher programs and the authorization encipher programs are programs designed to rearrange digital information in a predetermined manner and the file decipher programs, the decipher programs, the authorization decipher programs and the catalog decipher programs are designed to rearrange digital information back to a predetermined sequence or to select certain data from encoded information (the catalog decipher programs). Programs of this nature are well known in the art and one group of such programs which are commercially available are referred to as "RANDOM" in the Apple II plus programming language. It is preferred that only a small number, ten for example, of such programs might actually be maintained in storage and the select codes and the file select codes might also include numbers which cause any one of the stored programs to encipher in a different manner. In this manner any one of the various groups of programs would include the possibility of at least ten billion different programs which are available for use.

The information manufacturing machines 14, in a preferred form, are constructed or programmed such that all memory other than permanently stored memory in the digital storage unit 86 is erased if anyone attempts to gain access to the manufacturing program unit 92 or the digital storage unit 86 or the digital information converter 98 as a further security measure.

In one embodiment, the information manufacturing machines 14 also can be constructed or programmed to erase all memory other than the memory stored in the digital storage unit 86 if access is gained to the connection between the digital to analog converter 100 and the reproduction unit 24 or if access is gained to the reproduction unit 24, as a still further security measure.

Referring to the example of information embodied in recordings, high quality music requires a bandwidth of 20 KHz and, when digitized, the necessary communication bandwidth would be 160 KHz. Assuming a record album of twelve, 2½ minute songs were to be transmitted over telephone lines at 1200 BPS, it would take $12 \times 2.5 \times 160/1.2 = 4,000$ minutes. On the other hand, the equipment described herein operating in real time can be made to operate at 3.2 megabytes which would let the album be reproduced in approximately 0.2 minutes or 12 seconds. Additional speed can easily be achieved by using computers (chips) capable of operation at 32 megabytes if required. Also, parallel DMA channels can be used to reduce the speed even further to a practical limit of two to three seconds per music album or only a fraction of an hour for video tapes. Cable tv channels (6 megahertz bandwidth) could reduce the data transmission time from 4,000 minutes down to 0.8 minutes; but since 10,000 outlets (point of sale locations) may be trying to get the information at the same time, even such a method would still be impractical on a production line basis if the information to be reproduced had to be transmitted each time. Cable tv communication links would be a good method for delivering master files on a one time basis.

In one embodiment and in response to receiving a request reproduction code, the information control machine 12 can be programmed to encode the encoded information and communicate the encoded information over the communication link 18 for reception and reproduction by the information manufacturing machine 14 in a manner like that described before with respect to the catalog reproduce codes and the catalog transmit codes. In this manner, the information manufacturing machines 14 would not have any encoded information stored therein and could only function to reproduce information in material objects in response to receiving an authorization code which would include the encoded information. However, considering the communication link 18 to be a telephone line or an airway transmission type of link, the real time required to transmit the actual encoded information would not render this last mentioned embodiment economical from a time or expense viewpoint, except for transmitting encoded information to update the encoded information in the information manufacturing machines 14. For this reason, the preferred embodiment has been described as transmitting only programs over the communication link 18 in response to receiving request reproduction codes, which transmission time would be relatively small.

In one other embodiment, the manufacturing programming unit 92 in the information manufacturing machine 14 has stored therein the catalog decipher programs for decoding the encipher programs and file encipher programs from the encoded information stored in the digital storage unit 86. In this embodiment, the catalog decipher programs are not communicated by the information control machine 12 as part of the authorization code. Also, in this embodiment, a dollar charge code is inputted into the information access control unit 82 along with each catalog code when information is being inputted on the input line 16. The dollar charge code represents the amount of money to be credited to the owner of the information when the information is reproduced and this value may be different for each information. The dollar charge code is encoded in the information before the encoded information is stored in the digital file storage 68. The encoded information is communicated from the information control machine 12 to the digital storage unit 86 in the information manufacturing machine 14 in the manner described before and, thus, the encoded information in the information manufacturing machine 14 includes the dollar charge code for each information identified by the catalog codes.

In this alternate embodiment, the request reproduction code includes the IMM code and a dollar request code requesting authorization to reproduce a certain dollar amount of information. The request reproduction code is entered via the input line 21 into the information catalog and request unit 90 and communicated through the signal path 94 and the communication modem 88 and over the communication link 18 to the information control machine 12. The request reproduction code is received by the information access control unit 88 through the communication modem 80 and, if approved, the IMM code and a dollar authorization code authorizing the reproduction of a certain dollar value of information are communicated from the information access control unit 82 over the signal path 42 to the control manufacturing unit 72. The control manufacturing unit 72, in response, provides an authorization code which includes the IMM code, the dollar authorization code and an authorization select code on the signal path 44 to be communicated through the communication modem 80 and over the communication link 18 to the information manufacturing machine 14 identified by the IMM code. The authorization code communicated by the information control machine 12 is encoded according to an authorization encipher program in a manner like that described before. The authorization code communicated by the information control machine 12 is received by the manufacturing program unit 92 through the communication modem 88 and the information catalog and request unit 90. The manufacturing program unit 92 decodes the encoded authorization code in accordance with a predetermined authorization decipher program stored in the manufacturing program unit 92. The manufacturing program unit 92 is programmed to store the authorization decipher program identified by the decoded authorization select code which was encoded in the received authorization code for reasons described before and to store the decoded dollar authorization code.

In this alternate embodiment, catalog codes and request reproduction codes are entered into the information catalog and request unit 90 via the input line 21. However, in this embodiment, these codes are not communicated to the information control unit 12, rather, the inputted request reproduction code which includes a catalog code is provided to the manufacturing program unit 92 via the signal path 93. In response to receiving the request reproduction code which includes the catalog code, the manufacturing program unit 92 is programmed to decipher the encoded information identified by the received catalog code and provide the decoded information through the digital to analog converter 100 to the reproduction unit 24 for reproducing the information in a material object in a manner exactly like that described before with respect to reproducing certain selected information identified by catalog codes. After reproducing each information, the manufacturing program unit 92 is programmed to deduct from the dollar authorization code an amount of money equal to the value of the information just reproduced in the material object by the reproduction unit 24 which is represented by a dollar charge code and to store the catalog code as a catalog reproduced code in the manufacturing program unit 92 along with the dollar charge code. The manufacturing program unit 92 is programmed to cease permitting the reproduction of information when the dollar authorization code stored therein has been used or, in other words, when the information manufacturing machine 14 has reproduced information having a total dollar value represented by the dollar charge codes equal to the dollar value represented by the dollar authorization code stored in the manufacturing program unit 92. Periodically, the catalog reproduced codes and the corresponding dollar charge codes are communicated by the information manufacturing machine 14 to the information control machine 12 so the various owners of the reproduced information can be credited for payment.

EMBODIMENT OF FIG. 4

Shown in FIG. 4 is a modified information manufacturing machine 14a which is constructed exactly like the information manufacturing machine 14 shown in FIGS. 1 and 3 and described in detail before, except the modified information manufacturing machine 14a is particularly adapted to function in the nature of machines commonly referred to as vending machines.

The information manufacturing machine 14a includes a money acceptor-rejector 110 which is adapted to accept via an input 112 money in the form of cash (dollar bills or coins or both dollar bills and coins) or in the form of credit cards or in the form of inputted credit number information, and to provide an output money valid code on a signal path 114 in response to validating a certain amount of money received via the input 112. The money valid code includes data indicating the validation of a certain amount of money received and data indicating the amount of money received. The money valid code on the signal path 114 is received by the manufacturing program unit 92.

The information is inputted into the information manufacturing machine 14a in a manner exactly like that described before with respect to the information manufacturing machine 14 described before. Stored in the digital storage unit 86 is the encoded information, catalog codes uniquely identifying the information and dollar charge codes, each dollar charge code representing or uniquely identifying the amount of money to be charged in connection with the reproduction in a material object of the information identified via the catalog code associated with the particular dollar code.

The user or consumer inputs the selected catalog code into the information catalog and request unit 90 via the input line 21 representing a request to reproduce the selected information identified via the inputted catalog code in a material object. The user or the consumer inputs a certain amount of money into the money acceptor-rejector 110 via the input 112 which validates the amount of money inputted therein. In response to an invalidation of the inputted money, the money acceptor-rejector 110 rejects and returns the inputted money to the consumer and provides a money invalid code on the signal path 114. In response to a validation of the inputted money, the money acceptor-rejector 110 accepts the inputted money and provides the money valid code on the signal path 114.

The manufacturing program unit 92 receives the catalog code provided by the information catalog and request unit 90 and receives the signal outputted by the money acceptor-rejector 110 on the signal path 114. In response to receiving a money invalid code on the signal path 114, the manufacturing program unit 92 is programmed to disregard the catalog code inputted via the information catalog and request unit 90 and not authorize the reproduction of information in any material object.

In this embodiment, the user or consumer also inputs the request reproduction code which includes the catalog code via the input line 21 and the information catalog and request unit 90 provides the request reproduction code on the signal path 93, which is received by the manufacturing program unit 92. In response to receiving the request reproduction code on the signal path 93 and a money valid code on the signal path 114, the manufacturing program unit 92 is programmed to compare the dollar charge code (the amount of money represented via the dollar charge code) associated with the particular catalog code in the received request reproduction code with the amount of money represented via the received money valid code and, if a sufficient amount of money has been received in the money acceptor-rejector 110, the manufacturing program unit 92 is programmed to cause the reproduction of the information identified via the received catalog code in a material object in a manner exactly like that described before with respect to the information manufacturing machine 14 shown in FIG. 3.

The manufacturing program unit 92 then stores the catalog reproduced code and the corresponding dollar charge code indicating that the reproduction of the information identified via the catalog code has been reproduced in a material object. This data, the catalog reproduced codes and the dollar charge codes, are periodically communicated to the information control machine 12 via the communication link 18 along with the corresponding IMM codes.

Money acceptor-rejector devices which will function in a manner described before with respect to the money acceptor-rejector 110 for receiving money and providing output validation signals are well known in the art and a detailed description of such devices is not required herein.

In one embodiment, an intermediate device (not shown) can be utilized to collect the catalog reproduced codes and dollar charge codes from each of the information manufacturing machines 14a along with the corresponding IMM codes, and then the data can be communicated to the information control machine 12 utilizing such intermediate devices (not shown) either via a communication link such as the airways or telephone lines or the intermediate devices (not shown) can be utilized to communicate the collected data to the information control machine 12 directly utilizing the communication modem 80 and a corresponding or compatible modem in such intermediate device (not shown).

It should be noted that the catalog reproduced codes and the corresponding dollar charge codes provided by the information manufacturing machine 14a to account for the information which has been reproduced in material objects could be enciphered to protect the privacy of such data, if desired in a particular application.

As a further security measure the information manufacturing machines are constructed so that, in the event an individual gains physical access to a portion of the machine in an effort to obtain the encoded information, the encoded information is destroyed or erased. As yet a further security measure, each reproduction unit is identified by a unique reproduction unit code and each manufacturing program unit is constructed to receive the reproduction unit code outputted by the reproduction unit and to compare the received reproduction unit code with authorized reproduction unit codes to be sure the decoded information will be connected to and outputted to an authorized reproduction unit.

Changes may be made in the construction and operation of the various elements described herein or in the steps or the sequence of steps of the methods described herein without departing from the spirit and the scope of the invention as defined in the following claims.

I claim:

1. A method for reproducing information in material objects utilizing information manufacturing machines located at point of sale locations, comprising the steps of:

providing from a source remotely located with respect to the information manufacturing machine the information to be reproduced to the information manufacturing machine, each information being uniquely identified by a catalog code;

providing a request reproduction code including a catalog code uniquely identifying the information to be reproduced to the information manufacturing machine requesting to reproduce certain information identified by the catalog code in a material object;

providing an authorization code at the information manufacturing machine authorizing the reproduction of the information identified by the catalog code included in the request reproduction codes; and receiving the request reproduction code and the authorization code at the information manufacturing machine and reproducing in a material object the information identified by the catalog code included in the request reproduction code in response to the authorization code authorizing such reproduction.

2. The method of claim 1 for reproducing information in material objects utilizing the information manufacturing machines located at point of sale locations and an information control machine located remotely with respect to the information manufacturing machines, wherein the step of providing the request reproduction code is defined further to include the step of:

communicating from a point of sale location the request reproduction code requesting to reproduce selected inforamtion identified by the catalog code included in the request reproduction code in a material object utilizing an information manufacturing machine located at the point of sale location; and wherein the step of providing the authorization code is defined further to include the step of:

receiving the request reproduction code at the information control machine at a location remote with respect to the point of sale location and communicating to the information manufacturing machine at the point of sale location the authorization code authorizing the reproduction of the selected information identified by the catalog code included in the received request reproduction code by the information manufacturing machine located at the point of sale location.

3. The method of claim 2 defined further to include a plurality of point of sale locations and at least one information manufacturing machine located at each point of sale location and wherein the method is defined further to include the step of:

identifying each information manufacturing machine with an IMM code, each IMM code uniquely identifying one of the information manufacturing machines.

4. The method of claim 3 wherein the request reproduction code includes an IMM code uniquely identifying the information manufacturing machine to reproduce the selected information in a material object, and wherein the authorization code includes the IMM code included in the received request reproduction code for authorizing the reproduction of selected information via the information manufacturing machine identified via the IMM code in the authorization code.

5. The method of claim 2 wherein the step of providing the information to be reproduced to the information manufacturing machine is defined further to include the step of:

receiving information at the information control machine, each information being uniquely identifiable by a predetermined catalog code;

storing a plurality of encipher programs in the information control machine;

storing a plurality of file encipher programs in the information control machine;

encoding each received information identified by a catalog code according to one of the encipher programs;

storing the encoded information; and encoding the stored encoded information in accordance with one of the file encipher programs for communication to one of the information manufacturing machines identified by an IMM code.

6. The method of claim 5 wherein the step of encoding the stored encoded information is defined further as encoding the stored encoded information in accordance with different file encipher programs so the encoded information to be transferred to one information manufacturing machine is encoded with a different file encipher program as compared to the file encipher programs utilized to encode the encoded information to be transferred to any of the other information manufacturing machines.

7. The method of claim 5 wherein the step of providing the information to be reproduced to the information manufacturing machine is defined further to include the steps of:

storing a plurality of decipher programs in the information control machine, each decipher program being adapted to decode information encoded in accordance with one of the encipher programs and each encipher program and corresponding decipher program being uniquely identifiable by a select code; and storing a plurality of file decipher programs in the information control machine, each file decipher program being adapted to decode information encoded in accordance with one of the file encipher programs and each file encipher program and corresponding file decipher program being uniquely identifiable by a file select code; and wherein the step of encoding each received information according to one of the encipher programs is defined further as encoding the corresponding decipher program in each encoded information, and wherein the step of encoding the stored encoded information including the decipher program encoded therein according to one of the file decipher programs is defined further as encoding the corresponding file decipher program in the encoded information, each information being encoded according to one encipher program and having the corresponding decipher program encoded therein and being encoded according to one file encipher program and having the corresponding file decipher program encoded therein.

8. The method of claim 7 wherein the step of providing the information to be reproduced to the information manufacturing machines is defined further as communicating each information encoded in accordance with an encipher program identified by a predetermined select code and having the corresponding decipher program identified by the select code encoded therein and encoded in accordance with a file encipher program identified by a predetermined file select code and having the corresponding file decipher program identified by the file select code encoded therein and the catalog code identifying each information.

9. The method of claim 8 wherein the step of receiving the request reproduction code and providing the authorization code is defined further to include the steps of:

storing a plurality of catalog decipher programs in the information control machine, each catalog decipher program being adapted for decoding the decipher program and the file decipher program from the encoded information identified via one of the catalog codes;

determining and storing in the information control machine the catalog decipher program for each information, the information encoded utilizing the encipher program and the file encipher program; and determining the catalog decipher program for decoding the decipher program and the file decipher program from the encoded information identified via the catalog code included in the received request reproduction code;

including the determined catalog decipher program in the authorization code for communication to the information manufacturing machine.

10. The method of claim 9 wherein the step of receiving the authorization code and reproducing the selected information is defined further to include the steps of:

decoding the decipher program and the file decipher program from the encoded information identified via the catalog code in the authorization code and the corresponding request reproduction code utilizing the catalog decipher program encoded in the received authorization code;

decoding the information identified via the catalog code in the authorization code and the corresponding request reproduction code; and providing the decoded information for reproducing the information in a material object.

11. The method of claim 10 wherein the step of communicating the authorization code is defined further to include the steps of:

storing a plurality of authorization encipher programs in the information control machine, each authorization encipher program being uniquely identified via an authorization select code and each authorization encipher program being adapted to encipher an authorization code;

storing a plurality of authorization select codes in the information control machine; and encoding each authorization code in accordance with one predetermined authorization encipher program; and wherein the step of receiving the authorization code and reproducing the selected information in a material object is defined further to include the steps of:

storing a plurality of authorization decipher programs in the information manufacturing machine, each authorization decipher program being uniquely identified via one of the authorization select codes and each authorization decipher program being adapted to decipher an authorization code encoded in accordance with one of the authorization encipher programs; and decoding the received encoded authorization code in accordance with one of the authorization decipher programs.

12. The method of claim 11 wherein the step of communicating the authorization code is defined further to include the step of:

determining an authorization select code for use in the information manufacturing machine in decoding the next received authorization code and including this determined authorization select code in the authorization code; and wherein the step of receiving the authorization code and reproducing the selected information in a material object is defined further to include the steps of:

storing the authorization select code in the received authorization code for use in decoding the next received authorization code; and decoding the received encoded authorization code utilizing the authorization decipher program identified via the authorization select code in the last received authorization code.

13. The method of claim 5 wherein the encoded information stored in the information control machine is defined further as being in a digital format and wherein the step of receiving the information at the information control machine is defined further to include the step of:

converting the information received in an analog format to a digital format prior to encoding the information; and wherein the encoded information stored in the information manufacturing machine is defined further as being in a digital format and wherein the step of reproducing the information in a material object at the information manufacturing machine is defined further to include the step of:

converting the information stored in a digital format in the information manufacturing machine to an analog format prior to reproducing the information in a material object.

14. The method of claim 5 wherein the step of providing the information to be reproduced to the information manufacturing machine is defined further to include the step of:

providing a file reproduce command to the information control machine; and reproducing the encoded information in the manufacturing control machine in a material object for communicating the encoded information to the information manufacturing machine.

15. The method of claim 5 wherein the step of providing the information to be reproduced to the information manufacturing machine is defined further to include the steps of:

providing a catalog transmit command along with a catalog code at the information control machine; and communicating the information identified by the catalog code provided with the catalog transmit command via a communication link to the information manufacturing machine, the communication link being selected from a group of communication links comprising telephone lines, television cable and airways broadcasting.

16. The method of claim 1 wherein each information is uniquely identified by a predetermined catalog code and a dollar charge code, the dollar charge code indicating the amount of money to be charged in connection with the reproduction of said information and wherein the step of providing the information to be reproduced is defined further to include the steps of:

storing the information along with the corresponding catalog codes and dollar charge codes in the information manufacturing machines; and wherein the step of receiving the authorization code and reproducing the information in a material object is defined further to include:

storing a dollar authorization code in the information manufacturing machine, said dollar authorization code representing a dollar amount of authorized reproduction; and deducting the dollar amount represented by the dollar charge code in the authorization code from the dollar amount represented by the dollar authorization code stored in the information manufacturing machine and reproducing the information in a material object in response to a dollar amount of authorized reproduction represented by the dollar authorization code at least equal to the dollar amount represented by the dollar charge code.

17. The method of claim 1 wherein each information being uniquely identified by a predetermined catalog code and a dollar charge code, the dollar charge code indicating the amount of money to be charged in connection with the reproduction of said information; and wherein the step of providing the information to be reproduced is defined further to include the step of:

storing the information along with the corresponding catalog codes and dollar charge codes in the information manufacturing machines; and wherein the step of receiving the authorization code and reproducing the information in a material object is defined further to include:

producing one of a money valid code and a money invalid code in response to receiving an amount of money at the information manufacturing machine indicating the receipt of an amount of money indicated by the money valid code; and receiving the money valid code and comparing the amount of money represented by the received money valid code with the amount of money represented by the dollar charge code associated with the catalog code and reproducing the information in a material object if the amount of money represented by the received money valid code compares with the amount of money represented by the dollar charge code associated with the catalog code.

18. The method of claim 1 wherein the step of providing the selected information to the information manufacturing machine is defined further to include the step of:

receiving information at the information control machine, each information being uniquely identifiable by a predetermined catalog code;

storing a plurality of encipher programs in the information control machine;

storing a plurality of file encipher programs in the information control machine;

encoding each received information identified by a catalog code according to one of the encipher programs;

storing the encoded information; and encoding the stored encoded information in accordance with one of the file encipher programs for communication to one of the information manufacturing machines identified by an IMM code.

19. The method of claim 18 wherein the step of encoding the stored encoded information is defined further as encoding the stored encoded information in accordance with different file encipher programs so the encoded information to be transferred to one information manufacturing machine is encoded with a different file encipher program as compared to the file encipher programs utilized to encode the encoded information to be transferred to any of the other information manufacturing machines.

20. The method of claim 18 wherein the step of providing the information to the information manufacturing machine is defined further to include the steps of:

storing a plurality of decipher programs in the information control machine, each decipher program being adapted to decode information encoded in accordance with one of the encipher programs and each encipher program and corresponding decipher program being uniquely identifiable by a select code; and storing a plurality of file decipher programs in the information control machine, each file decipher program being adapted to decode information encoded in accordance with one of the file encipher programs and each file encipher program and corresponding file decipher program being uniquely identifiable by a file select code; and wherein the step of encoding each received information according to one of the encipher programs is defined further as encoding the corresponding decipher program in each encoded information, and wherein the step of encoding the stored encoded information including the decipher program encoded therein according to one of the file decipher programs is defined further as encoding the corresponding file decipher program in the encoded information, each information being encoded according to one encipher program and having the corresponding decipher program encoded therein and being encoded according to one file encipher program and having the corresponding file decipher program encoded therein.

21. The method of claim 20 wherein the step of providing the information to the information manufacturing machines is defined further as communicating each information encoded in accordance with an encipher program identified by a predetermined select code and having the corresponding decipher program identified by the select code encoded therein and encoded in accordance with a file encipher program identified by a predetermined file select code and having the corresponding file decipher program identified by the file select code encoded therein and the catalog code identifying each information.

22. The method of claim 18 wherein the encoded information stored in the information control machine is defined further as being in a digital format and wherein the step of receiving the information at the information control machine is defined further to include the step of:

converting the information received in an analog format to a digital format prior to encoding the information.

23. The method of claim 18 wherein the step of providing the information to the information manufacturing machine is defined further to include the step of:

providing a file reproduce command to the information control machine; and reproducing the encoded information in the manufacturing control machine in a material object for communicating the encoded information to the information manufacturing machine.

24. The method of claim 18 wherein the step of providing the selected information to the information manufacturing machine is defined further to include the steps of:

providing a catalog transmit command along with a catalog code to the information control machine; and communicating the information identified by the catalog code provided with the catalog transmit command via a communication link to the information manufacturing machine, the communication link being selected from a group of communication links comprising telephone lines, television cable and airways broadcasting.

25. The method of claim 1 wherein the information is defined further as being in a digital format or being convertible to a digital format, and wherein the step of providing the information to be reproduced to the information manufacturing machine is defined further to include the steps of:

reproducing the information in a digital format in a video bandwidth medium; and providing the video bandwidth medium having the information in a digital format fixed therein to the information manufacturing machine.

26. The method of claim 1 wherein the information is defined further as being in a digital format or convertible to a digital format, and wherein the step of providing the information to be reproduced to the information manufacturing machine is defined further to include the step of:

transmitting the information in a digital format via a video bandwidth cannel to the information manufacturing machine.

27. The method of claim 1 wherein the material object is defined further as being a device in which information is embodied and from which the information embodied therein is perceivable, reproducable, usable or otherwise communicatable either directly or with the aid of other machines or devices.

28. The method of claim 27 wherein the material object is defined further as being selected from a group consisting of: audio tape capable of having fixed therein information in the form of sound recordings; audio disc capable of having fixed therein information in the form of sound recordings; video tape capable of having fixed therein information in the form of pictures and or audio; video disc capable of having fixed therein information in the form of pictures and or audio; media capable of having fixed thereon information in the form of printed matter (words, symbols and or pictures); devices capable of having fixed therein inforamtion in the form of digital data; or combinations thereof.

29. A method for reproducing information in material objects utilizing information manufacturing machines located at point of sale locations and an information control machine located remotely with respect to the information manufacturing machines, the information manufacturing machines being capable of communicating from a point of sale location a request reproduction code requesting to reproduce selected information in a material object utilizing an information manufacturing machine located at the point of sale location, comprising the steps of:

providing the selected information to the information manufacturing machine located at the point of sale location, receiving the request reproduction code including a catalog code uniquely identifying the information to be reproduced at the information control machine at a location remote with respect to the point of sale location and communicating for receiving by an information manufacturing machine at the point of sale location an authorization code including a catalog code uniquely identifying the information to be reproduced authorizing the reproduction of the information identified by the catalog code by the information manufacturing machine located at the point of sale location.

30. The method of claim 29 wherein there are a plurality of point of sale locations and at least one information manufacturing machine located at each point of sale location, each information manufacturing machine being uniquely identified by an IMM code, the request reproduction code including an IMM code uniquely identifying the information manufacturing machine to reproduce the information identified by the catalog code included in the request reproduction code in a material object, and wherein the authorization code includes the IMM code included in the received request reproduction code for authorizing the reproduction of information identified by the catalog code via the information manufacturing machine identified via the IMM code in the authorization code.

31. The method of claim 29 wherein the step of communicating the authorization code is defined further to include the steps of:

storing a plurality of authorization encipher programs in the information control machine, each authorization encipher program being uniquely identified via an authorization select code and each authorization encipher program being adapted to encipher an authorization code;

storing a plurality of authorization select codes in the information control machine; and encoding each authorization code in accordance with one predetermined authorization encipher program.

32. The method of claim 31 wherein the step of communicating the authorization code is defined further to include the step of:

determining an authorization select code for use in the information manufacturing machine in decoding the next received authorization code and including this determined authorization select code in the authorization code.

33. The method of claim 29 wherein the information is defined further as being in a digital format or being convertible to a digital format, and wherein the step of providing the information to be reproduced to the information manufacturing machine is defined further to include the steps of:

reproducing the information in a digital format in a video bandwidth medium; and providing the video bandwidth medium having the information in a digital format fixed therein to the information manufacturing machine.

34. The method of claim 29 wherein the information is defined further as being in a digital format or convertible to a digital format, and wherein the step of providing the information to be reproduced to the information manufacturing machine is defined further to include the step of:

transmitting the information in a digital format via a video bandwidth cannel to the information manufacturing machine.

35. The method of claim 29 wherein the material object is defined further as being a device in which information is embodied and from which the information embodied therein is perceivable, reproducable, usable or otherwise communicatable either directly or with the aid of other machines or devices.

36. The method of claim 35 wherein the material object is defined further as being selected from a group consisting of: audio tape capable of having fixed therein information in the form of sound recordings; audio disc capable of having fixed therein information in the form of sound recordings; video tape capable of having fixed therein information in the form of pictures and or audio; video disc capable of having fixed therein information in the form of pictures and or audio; media capable of having fixed thereon information in the form of printed matter (words, symbols and or pictures); devices capable of having fixed therein information in the form of digital data; or combinations thereof.

37. An apparatus for reproducing information in material objects at point of sale locations, comprising:

an information manufacturing machine located at a point of sale location for reproducing information in material objects, each information to be reproduced being uniquely identified by a catalog code and each information being received from a source remotely located with respect to the information manufacturing machine and each information being stored in the information manufacturing machine, the information manufacturing machine receiving a request reproduction code including a catalog code uniquely identifying the information to be reproduced and being adapted to provide an authorization code including the catalog code included in the request reproduction code, and the information manufacturing machine being adapted to reproduce the information identified by the catalog code in a material object in response to receiving the authorization code.

38. The apparatus of claim 37 wherein the information manufacturing machine is defined further as being adapted to communicate the request reproduction code, and wherein the apparatus is defined further to include:

an information control machine for receiving the request reproduction code communicated from the information manufacturing machine, and being adapted to provide and communicate the authorization code for receiving by the information manufacturing machine in response to a received request reproduction code, the information to be reproduced being stored in the information control machine and the information control machine being adapted to provide and communicate the information to be reproduced for receiving by the information manufacturing machine.

39. The apparatus of claim 38 defined further to include a plurality of point of sale locations and at least one information manufacturing machine located at each point of sale location, each information manufacturing machine being uniquely identifying by an IMM code, and wherein the request reproduction code includes an IMM code uniquely identifying the information manufacturing machine to reproduce the information identified by the catalog code included in the request reproduction code in a material object, and wherein the authorization code includes the IMM code included in the received request reproduction code for authorizing the reproduction of information identified by the catalog code included in the request reproduction code via the information manufacturing machine identified via the IMM code in the authorization code.

40. The apparatus of claim 38 wherein the information control machine is defined further as being adapted to receive the information to be reproduced, the information control machine having stored therein a plurality of encipher programs and a plurality of file encipher programs, and the information control machine being adapted to encode each received information identified by a catalog code according to one of the encipher programs and store the encoded information, and to encode the stored encoded information in accordance with one of the file encipher programs for communication to one of the information manufacturing machines identified by an IMM code.

41. The apparatus of claim 40 wherein the information control machine is defined further as encoding the stored encoded information in accordance with different file encipher programs so the encoded information to be transferred to one information manufacturing machine is encoded with a different file encipher program as compared to the file encipher programs utilized to encode the encoded information to be transferred to any of the other information manufacturing machines.

42. The apparatus of claim 40 wherein the information control machine is defined further as having stored therein a plurality of decipher programs in the information control machine, each decipher program being adapted to decode information encoded in accordance with one of the encipher programs and each encipher program and corresponding decipher program being uniquely identifiable by a select code, and a plurality of file decipher programs in the information control machine, each file decipher program being adapted to decode information encoded in accordance with one of the file encipher programs and each file encipher program and corresponding file decipher program being uniquely identifiable by a file select code, and the information control machine encoding the corresponding decipher program in each encoded information, and encoding the corresponding file decipher program in the encoded information, each information being encoded according to one encipher program and having the corresponding decipher program encoded therein and being encoded according to one file encipher program and having the corresponding file decipher program encoded therein.

43. The apparatus of claim 42 wherein the information control machine is defined further as being adapted to communicate each information encoded in accordance with an encipher program identified by a predetermined select code and having the corresponding decipher program identified by the select code encoded therein and encoded in accordance with a file encipher program identified by a predetermined file select code and having the corresponding file decipher program identified by the file select code encoded therein and the catalog code identifying each information.

44. The apparatus of claim 43 wherein the information control machine is defined further as having stored therein a plurality of catalog decipher programs, each catalog decipher program being adapted for decoding the decipher program and the file decipher program from the encoded information identified via one of the catalog codes, the information control machine being adapted to determine and store therein the catalog decipher program for each information, the information encoded utilizing the encipher program and the file encipher program, and to determine the catalog decipher program for decoding the decipher program and the file decipher program from the encoded information identified via the catalog code included in the received request reproduction code, and to include the determined catalog decipher program in the authorization code for communication to the information manufacturing machine.

45. The apparatus of claim 44 wherein the information manufacturing machine is defined further as being adapted to decode the decipher program and the file decipher program from the encoded information identified via the catalog code in the authorization code and the corresponding request reproduction code utilizing the catalog decipher program encoded in the received authorization code, and to decode the information identified via the catalog code in the authorization code and the corresponding request reproduction code, and to provide the decoded information for reproducing the information in a material object.

46. The apparatus of claim 45 wherein the information control machine is defined further as having stored therein a plurality of authorization encipher programs, each authorization encipher program being uniquely identified via an authorization select code and each authorization encipher program being adapted to encipher an authorization code, and as having stored therein a plurality of authorization select codes, the information control machine encoding each authorization code in accordance with one predetermined authorization encipher program, and wherein the information manufacturing machine is defined further as having store therein a plurality of authorization decipher programs, each authorization decipher program being uniquely identified via one of the authorization select codes and each authorization decipher program being adapted to decipher an authorization code encoded in accordance with one of the authorization encipher programs, and the information manufacturing machine decoding the received encoded authorization code in accordance with one of the authorization decipher programs.

47. The apparatus of claim 46 wherein the information manufacturing machine is defined further as being adapted to determine an authorization select code for use in the information manufacturing machine in decoding the next received authorization code and to include this determined authorization select code in the authorization code, and wherein the information manufacturing machine is defined further as having stored therein the authorization select code in the received authorization code for use in decoding the next received authorization code, and the information manufacturing machine decoding the received encoded authorization code utilizing the authorization decipher program identified via the authorization select code in the last received authorization code.

48. The apparatus of claim 40 wherein the encoded information stored in the information control machine is defined further as being in a digital format and wherein the information control machine is defined further as being adapted to convert the information received in an analog format to a digital format prior to encoding the information, and wherein the encoded information stored in the information manufacturing machine is defined further as being in a digital format and wherein the information manufacturing machine is defined further as being adapted to convert the information stored in a digital format in the information manufacturing machine to an analog format prior to reproducing the information in a material object.

49. The apparatus of claim 40 wherein the information control machine is defined further as being adapted to provide a file reproduce command and to reproduce the encoded information in the manufacturing control machine in a material object for communicating the encoded information to the information manufacturing machine.

50. The apparatus of claim 40 wherein the information control machine is defined further as being adapted to provide a catalog transmit command along with a catalog code, and to communicate the information identified by the catalog code provided with the catalog transmit command via a communication link to the information manufacturing machine, the communication link being selected from a group of communication links comprising telephone lines, television cable and airways broadcasting.

51. The apparatus of claim 38 wherein the information control machine is defined further as receiving information, each information being uniquely identified by a predetermined catalog code and a dollar charge code, the dollar charge code indicating the amount of money to be charged in connection with the reproduction of said information, the information control machine communicating the information along with the corresponding catalog codes and dollar charge codes to the information manufacturing machine; and wherein the information manufacturing machine is defined further as storing the information along with the corresponding catalog codes and dollar charge codes, storing a dollar authorization code, said dollar authorization code representing a dollar amount of authorized reproduction, and deducting the dollar amount represented by the dollar charge code in the authorization code from the dollar authorization code stored in the information manufacturing machine and reproducing the information in a material object in response to a dollar amount of authorized reproduction represented by the dollar authorization code at least equal to the dollar amount represented by the dollar charge code.

52. The apparatus of claim 38 wherein each information being uniquely identified by a predetermined catalog code and a dollar charge code, the dollar charge code indicating the amount of money to be charged in connection with the reproduction of said information, and wherein the information manufacturing machine is defined further as having stored therein the information along with the corresponding catalog codes and dollar charge codes in the information machines, the information manufacturing machine producing one of a money valid code and a money invalid code in response to receiving an amount of money at the information manufacturing machine indicating the receipt of an amount of money indicated by the money valid code and comparing the amount of money represented by the received money valid code with the amount of money represented by the dollar charge code associated with the catalog code and reproducing the information in a material object if the amount of money represented by the received money valid code compares with the amount of money represented by the dollar charge code associated with the catalog code.

53. The apparatus of claim 37 wherein the information is defined further as being in a digital format or being convertible to a digital format, and wherein the information to be reproduced provided to the information manufacturing machine is defined further as being:
reproduced in a digital format in a video bandwidth medium and the video bandwidth medium having the information in a digital format fixed therein being storeable in the information manufacturing machine.

54. The apparatus of claim 37 wherein the information is defined further as being in a digital format or convertible to a digital format, and wherein the information to be reproduced to the information manufacturing machine is defined further as being transmitted in a digital format via a video bandwidth cannel to the information manufacturing machine.

55. The apparatus of claim 37 wherein the material object is defined further as being a device in which information is embodied and from which the information embodied therein is perceivable, reproducable, usable or otherwise communicatable either directly or with the aid of other machines or devices.

56. The apparatus of claim 55 wherein the material object is defined further as being selected from a group consisting of: audio tape capable of having fixed therein information in the form of sound recordings; audio disc capable of having fixed therein information in the form of sound recordings; video tape capable of having fixed therein information in the form of pictures and or audio; video disc capable of having fixed therein information in the form of pictures and or audio; media capable of having fixed thereon information in the form of printed matter (words, symbols and or pictures); devices capable of having fixed therein inforamtion in the form of digital data; or combinations thereof.

* * * * *

UNITED STATES PATENT AND TRADEMARK OFFICE
CERTIFICATE OF CORRECTION

PATENT NO. : 4,528,643
DATED : July 9, 1985
INVENTOR(S) : Charles C. Freeny, Jr.

It is certified that error appears in the above-identified patent and that said Letters Patent is hereby corrected as shown below:

Column 27, line 32, after the word "to" please add the phrase --provide the authorization code for--.

Column 27, line 32, please delete the word "cause" and substitute therefor the word --causing--.

Column 28, line 40, please delete the word "codes;" and substitute therefor the word --code;--.

Signed and Sealed this

Eleventh Day of February 1986

[SEAL]

Attest:

DONALD J. QUIGG

Attesting Officer

Commissioner of Patents and Trademarks